United States Patent
Thue et al.

(10) Patent No.: US 10,410,162 B2
(45) Date of Patent: Sep. 10, 2019

(54) MANAGEMENT OF LOSS RECONCILIATION DATA

(75) Inventors: Louisa Yvonne Thue, Vancouver (CA); Liezel Lorico, Vancouver (CA); Sumant Gandhi, Vancouver (CA); Kai Wang, Burnaby (CA); Nathan Joseph Alexander Dobie, Maple Ridge (CA)

(73) Assignee: Navarik Corp., Vancouver (CA)

( * ) Notice: Subject to any disclaimer, the term of this patent is extended or adjusted under 35 U.S.C. 154(b) by 516 days.

(21) Appl. No.: 13/621,097

(22) Filed: Sep. 15, 2012

(65) Prior Publication Data

US 2013/0013466 A1 Jan. 10, 2013

Related U.S. Application Data

(62) Division of application No. 12/790,307, filed on May 28, 2010, now Pat. No. 8,301,517.

(60) Provisional application No. 61/182,585, filed on May 29, 2009.

(51) Int. Cl.
*G06Q 10/08* (2012.01)
*G06Q 10/04* (2012.01)

(52) U.S. Cl.
CPC ........... *G06Q 10/083* (2013.01); *G06Q 10/04* (2013.01)

(58) Field of Classification Search
CPC ....... G06Q 10/08; G06Q 10/04; G06Q 10/083
USPC ....... 705/28, 30, 1, 338, 333, 7.13; 235/376, 235/384
See application file for complete search history.

(56) References Cited

U.S. PATENT DOCUMENTS

| | | | |
|---|---|---|---|
| 5,870,711 A * | 2/1999 | Huffman | 705/7.13 |
| 6,222,484 B1 * | 4/2001 | Seiple | B63C 9/0005 342/357.55 |
| 6,463,419 B1 * | 10/2002 | Kluss | G06Q 10/08 705/330 |
| 6,550,408 B1 * | 4/2003 | Janssen | B63B 1/121 114/121 |
| 6,929,181 B1 | 8/2005 | Oswalt | |
| 6,988,079 B1 | 1/2006 | Or-Bach et al. | |
| 8,301,571 B2 | 10/2012 | Thue et al. | |
| 2002/0032573 A1 | 3/2002 | Williams et al. | |
| 2003/0004830 A1 | 1/2003 | Frederick | |
| 2003/0052786 A1 | 3/2003 | Dickinson | |

(Continued)

OTHER PUBLICATIONS

"Industrial Data & Info Inc (IDII): New research report "Who's Who in 3PL WMS Software"—Warehouse management system software solutions for third party logistics providers." M2 Presswire Nov. 2, 2004 ProQuest Newsstand, ProQuest, Web. 22 Jun. 2012.

(Continued)

*Primary Examiner* — Vanel Frenel
(74) *Attorney, Agent, or Firm* — Knobbe, Martens, Olson & Bear, LLP

(57) ABSTRACT

A cargo management system receives parcel data associated with cargo on a vessel. The parcel data may include bill of lading date, successor and predecessor data, cargo type data, and the like. The cargo management system identifies parcels that may be related, performs a parcel validation on the identified parcels, and receives or determines a relationship between the parcels. Then, the cargo management system performs voyage validation on the related parcels to create a voyage. The cargo management system then calculates a loss associated with each parcel, between parcels, and the entire voyage.

5 Claims, 12 Drawing Sheets

(56) References Cited

U.S. PATENT DOCUMENTS

| | | |
|---|---|---|
| 2003/0101143 A1 | 5/2003 | Montgomery |
| 2004/0215480 A1* | 10/2004 | Kadaba ................. B07C 3/00 705/338 |
| 2004/0215532 A1* | 10/2004 | Boman ................. G06Q 10/06 705/28 |
| 2005/0006469 A1 | 1/2005 | Nonneman et al. |
| 2005/0055285 A1* | 3/2005 | Myrick ................. G06Q 10/08 705/28 |
| 2005/0216294 A1* | 9/2005 | Labow ............... G06Q 10/0833 705/333 |
| 2006/0185993 A1 | 8/2006 | Wilskey et al. |
| 2007/0008120 A1 | 1/2007 | Smith et al. |
| 2007/0198375 A1 | 8/2007 | Aptekar |
| 2008/0004928 A1* | 1/2008 | Trellevik ............... G06Q 10/08 705/331 |
| 2008/0042842 A1* | 2/2008 | Ulibarri ..................... 340/572.1 |
| 2008/0154749 A1 | 6/2008 | D'hooghe et al. |
| 2008/0275760 A1 | 11/2008 | Easterly et al. |
| 2009/0319391 A1* | 12/2009 | Su ................................. 705/26 |
| 2010/0287073 A1* | 11/2010 | Kocis ................. G06Q 10/047 705/28 |
| 2011/0215948 A1 | 9/2011 | Borgerson et al. |
| 2013/0013466 A1 | 1/2013 | Heaton et al. |

OTHER PUBLICATIONS

U.S. Appl. No. 13/600,945, Vessel Experience Factor Management, filed Aug. 31, 2012.

* cited by examiner

MANAGEMENT OF LOSS RECONCILIATION DATA

CROSS-REFERENCE TO RELATED APPLICATIONS

This utility patent application is a divisional of U.S. patent application Ser. No. 12/790,307 entitled MANAGEMENT OF LOSS RECONCILIATION DATA, filed May 28, 2010, which claims the benefit under 35 U.S.C. § 119(e) of U.S. Provisional Patent Application 61/182,585, filed on May 29, 2009, which is hereby incorporated by reference in its entirety.

BACKGROUND

Throughout the world, oil or other cargo is transported from one port to another on vessels. The transportation of cargo on vessels is generally referred to as a voyage. Generally speaking, oil, for example, is typically lost during the loading, transporting, and discharging activities of a voyage. This cargo loss can amount to hundreds of millions of dollars of lost revenue. Decreasing cargo loss by a fraction of one percent may increase revenues significantly. Thus, the analysis of cargo loss and associated parameters is an important undertaking for companies to perform in order to identify problem areas, improve efficiency, and increase revenues.

Companies typically rely on inspectors to determine the amount of loss associated with each load, transport, and discharge during a voyage. Each time cargo is loaded or discharged from a vessel, the inspectors take a number of measurements on the vessel and at the port. The inspectors then use various equations to calculate and report the loss to the companies. The loss can be calculated for each load, transfer, discharge, segment or leg of a voyage, or for the entire voyage. A transfer may also be referred to as a ship-to-ship transfer or STS transfer. The calculation of various cargo losses associated with a voyage is often referred to as loss reconciliation.

Each loss report reported by an inspector typically refers to a single load, transfer, or discharge of cargo. The various loss reports can then be associated together to determine the loss reconciliation. The process of determining loss reconciliation can be very difficult because not all losses are reported or available and reported losses may be inconsistent or miscalculated.

If the loss associated with one load, transfer, or discharge is not reported, loss for the entire voyage may not be calculated. Thus, if just one loss report is unreported, or is not available, a company may be unable to determine the losses associated with the voyage. Furthermore, the company may be unable to further investigate the loss and take appropriate action to decrease loss and increase efficiency.

Inconsistent loss reports may be time consuming to analyze or simply unusable. As mentioned above, several measurements must be taken for each load, transfer, or discharge of cargo. If all the correct measurements are not made, or are inconsistent, a company may be unable to use the loss report to calculate the loss reconciliation. Without this valuable information, the company will be unable to implement procedures to reduce loss, improve efficiency, and increase revenue.

Due to the nature of calculating losses, correcting miscalculations can be time consuming and burdensome. Furthermore, miscalculations may not even be identified, leading to an erroneous loss reconciliation and costing a company millions of dollars.

DETAILED DESCRIPTION

Generally described, the present disclosure is directed to a system, method, and computer-readable non-transitory storage medium for managing cargo inspection processes and associated data for providing accurate cargo loss calculations. Specifically, aspects of the disclosure will be described with regard to receiving cargo and voyage information, validating the information, and calculating losses associated with the cargo and voyage. Although various aspects of the disclosure will be described with regard to examples and embodiments, one skilled in the art will appreciate that the disclosed embodiments and examples should not be construed as limiting.

In the present disclosure, a parcel refers to a specific piece of cargo that is being moved or transferred at a specific location and time. Information associated with an individual parcel is referred to as parcel data. Parcel data may also be referred to as parcel information, parcel components, and the like.

In the present disclosure, and as mentioned above loss reconciliation refers to calculating various cargo losses associated with a voyage. Loss reconciliation may also be referred to as loss calculation, calculating loss, reconciling loss, and the like.

Figure 1:
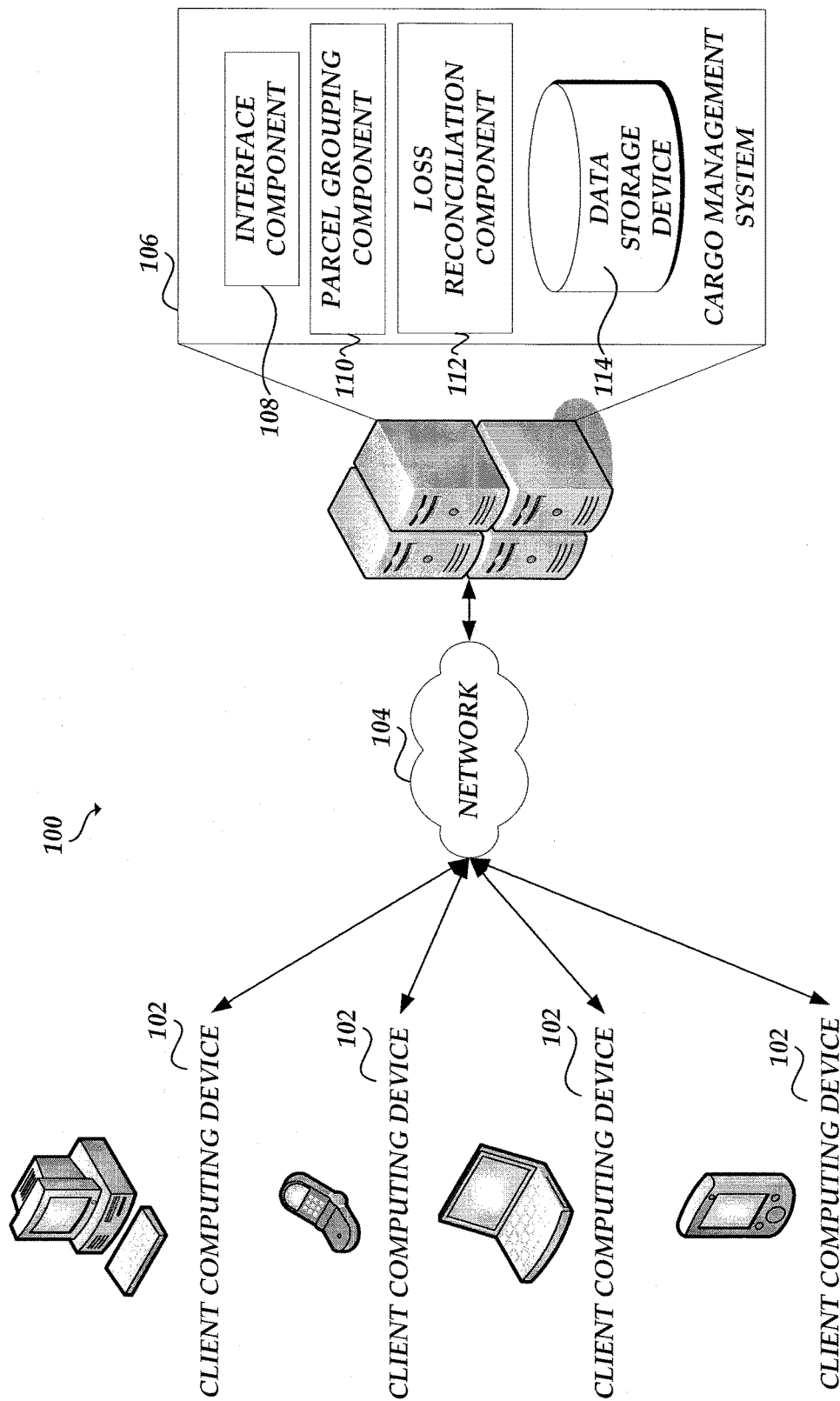
FIG. 1 is a block diagram illustrative of a cargo management environment including a number of client computing devices and a cargo management system.

FIG. 1 is a block diagram illustrative of a cargo management environment 100 for the management of cargo being transported. As illustrated in FIG. 1, the cargo management environment 100 includes a number of client computing devices 102 in communication with a cargo management system 106 via a communication network 104. As illustrated in FIG. 1, the client computing devices 102, cargo management system 106, and communication network 104 may each be different devices.

With further reference to FIG. 1, the client computing devices 102 (also generally referred to as clients) request and submit cargo information to the cargo management system 106 via the communication network 104. In an illustrative embodiment, the client computing devices 102 can correspond to a wide variety of computing devices including personal computing devices, laptop computing devices, hand-held computing devices, terminal computing devices, mobile devices, wireless devices, various electronic devices, appliances and the like. In an illustrative embodiment, the client computing devices 102 include necessary hardware and software components for establishing communication over the communication network 104. For example, the client computing devices 102 may be equipped with networking equipment and browser software applications that facilitate communication via the communication network 104. Although not illustrated in FIG. 1, each client computing device 102, may also display a user interface. The user interface may include various menus and fields for entering and displaying parcel data. The user interface may further present the results of any processing performed by the cargo management system 106 in an easy to understand format.

With continued reference to FIG. 1, the communication network 104 may comprise any number of different networks including a wide area network, local area network, a satellite network, a cable network, a personal area network, or the like. The network may be a wireless network, wired network, or a combination thereof. In one embodiment, the communication network 104 may be the Internet or an intranet.

With still further reference to FIG. 1, the cargo management environment 100 includes a cargo management system 106 in communication with the one or more client computing devices 102 via the communication network 104. The cargo management system 106 illustrated in FIG. 1 corresponds to a logical association of one or more computing devices associated with a cargo management system 106. Specifically, in an illustrative embodiment, the cargo management system 106 can include an interface component 108, a parcel grouping component 110, a loss reconciliation component 112, and a storage component 114.

One skilled in the relevant art will appreciate that the cargo management system 106 can be associated with various additional computing resources, such as voyage/trip components, nomination components, inspection components, supporting catalog data components, time log components, invoice components, reporting component, administrative components, servers, and the like. For example, although not illustrated, cargo management system 106 can be associated with one or more authentication components, located either locally or remotely, for authenticating a client computing device 102 before the client computing device 102 is allowed access to the features of the cargo management system 106.

The interface component 108 may be used to send and receive parcel data, loss data, loss reconciliation information, and the like to the client computing device 102. The interface component 108 may be configured to communicate with the client computing device 102 via the communication network 104. The interface component 108 may also be capable of translating the data received via the communication network 104 into a format understandable by the cargo management system 106 and vice versa.

The parcel grouping component 110 may be generally used to identify and group parcels. The parcel grouping component 110 may further perform a number of validation tests on the identified parcels to ensure that they may be grouped. The parcel grouping component 110 may also be used to group the parcels to form a voyage.

The loss reconciliation component 112 may be used to determine a loss associated with a particular parcel, between parcels, or over a voyage. As will be discussed in further detail below, the loss reconciliation component 112 may be used to calculate a number of different types of losses associated with the voyage.

The data storage device 114 may be used to store logs 202, reports 204, invoices 206, parcel data 214, parcel quantity data 234, loss data 210, and the like. The information stored on data storage device 114 will be described in further detail below in reference to FIG. 2. The data storage device 114 may reside locally on the same device as the cargo management system 106 or it may be located remotely and communicate with the cargo management system 106 via the communication network 104. Furthermore, the data storage device 114 may comprise one or many data storage devices, each device containing the same or different data.

One skilled in the relevant art will also appreciate that the components and configurations provided in FIG. 1 are illustrative in nature. Accordingly, additional or alternative components and/or configurations, especially regarding the additional components, systems, and subsystems for facilitating communication may be utilized. Additionally, the various components associated with the cargo management system 106 may be located within a single device, or may be distributed among a number of different devices. When distributed among a number of devices, the different devices may communicate via the communication network 104. In one embodiment, the cargo management system 106 and client computing device 102 may be located within a single device. In this, or any other embodiment, the data storage device 114 may be located locally or remotely. Thus, the cargo management environment 100 may be arranged in any number of configurations without departing from the spirit or scope of the present description.

Figure 2:
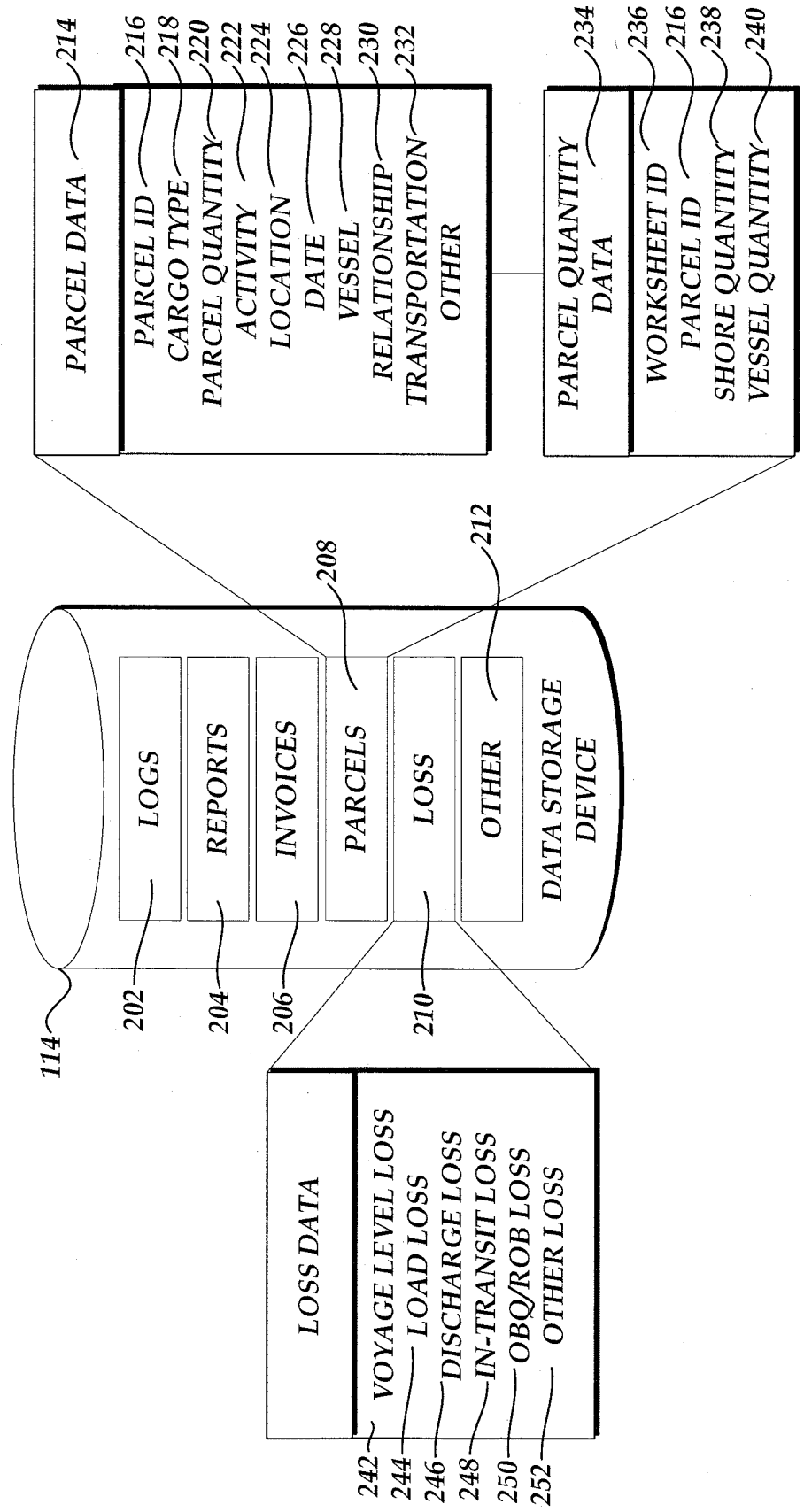
FIG. 2 is a block diagram illustrative of an expanded view of a data storage device associated with the cargo management system of FIG. 1.

Turning now to FIG. 2, an illustrative embodiment of the data storage device 114 is provided. As similarly set forth above, the data storage device 114 may reside locally on the same device as the cargo management system 106 or it may be located remotely and communicate with the cargo management system 106 via the communication network 104. Furthermore, the data storage device 114 may comprise one or many data storage devices, each device containing the same or different data. The data storage device 114 may store, for example, logs 202, reports 204, invoices 206, parcel data 214, parcel quantity data 234, loss data 242-252, and the like.

The logs 202 may comprise data relating to a particular parcel, voyage, user access, and the like. The log may also contain access and use information for a particular client computing device 102 or user. In one embodiment, the logs 202 include time logs and include information regarding the load and discharge of parcels. For example, the time logs may include information regarding the time a vessel made port, the time hoses and other equipment were attached to the vessel, and the like. In another embodiment, the logs 202 include user access data relating to the time a user logged on to the cargo management system 106, the amount of time using the system, and the like. Additional logs are envisioned without departing from the spirit and scope of the disclosure. Thus in one embodiment, predecessor vessel may include mother vessels and successor vessels may include daughter vessels. In another embodiment, predecessor vessels may include daughter vessels and successor vessels include mother vessels.

The reports 204 may comprise information relating to a particular parcel or voyage formatted to be easily understood by a user. In one embodiment, the report 204 may simply be the data from a log formatted to facilitate comprehension. The reports 204 may incorporate logs 202, parcel data 214, or loss data 242-252 in an easy to understand format. The reports 204 may show historical information or trends of losses. The reports 204 may additionally contain information to aid in the diagnosis of locations with loss problems and aid in developing strategies to improve the losses.

The invoices 206 contain accounting information. The invoices 206 may relate to companies using the cargo management system 106 and contain information on system use and amounts owed. The invoices 206 may further indicate past due amounts, credits, historical indications, trends, and the like.

With further reference to FIG. 2, an expanded view of one embodiment of the parcel data 214 is illustrated. The parcel data 214 is used by the cargo management system 106 to identify, group, match, order, validate and/or otherwise organize the various parcels that are received by the cargo management system 106. The parcel data 214 is further used to calculate the loss of an individual parcel, the loss between parcels, or the loss of an entire voyage. Loss associated with an individual parcel may also be referred to as parcel level loss. Loss associated with an entire voyage may also be referred to as voyage level loss or shore-to-shore loss.

The parcel data 214 may include, but is not limited, to parcel identifier data 216, cargo type data 218, parcel quantity data 220, location data 224, date data 226, a vessel data 228, activity data 222, relationship data 230, transportation mode data 232, and the like. Although not illustrated in FIG. 2, the parcel data 214 may further include source and destination data, cargo ID data, inspector data, trip ID data, ownership data, predecessor vessel data, or any other data that may aid the cargo management system 106 to correctly identify, group, and/or validate parcels, as well as calculate loss. Entering and submitting the parcel data 214 for a new parcel to cargo management system 106 may be referred to as a nomination. A nomination may be performed by a user associated with a particular company, an inspector, or the like.

In one embodiment, the parcel identifier data 216 is a unique identifier that allows the cargo management system 106 to correctly identify a parcel from all other parcels. The unique identifier may constitute symbols, numbers, letters, bar codes, or combinations thereof, or any other form of identification that allows the cargo management system 106 to distinguish the parcel from all other parcels.

In one embodiment, the cargo type data 218 identifies the cargo from one of several different types. The cargo types may be preprogrammed into the cargo management system 106, or the cargo management system 106 may receive the cargo type data dynamically via the communication network 104. For example, the cargo type data 218 may represent various grades of oil that a particular company ships. In one embodiment, the cargo type data 218 further includes a parent-level cargo type. Referring to the previous example, the parent-level cargo type data may include, but is not limited to, crude, liquid natural gas (LGN), chemical, or products. The parent-level cargo types may be preprogrammed so that a menu is presented to a user showing the various parent-level cargo types that may be selected. Alternatively, the parent-level cargo type may be generated programmatically.

The parcel quantity data 220 identifies the amount of cargo that is to be transported. In one embodiment, the parcel quantity data 220 may represent an estimate of the amount of cargo to be transported, and may differ from the actual quantity loaded or discharged. For example, in one embodiment, the cargo quantity may be 1,000,000 Bbls, however, the amount measured by an inspector on site may be greater than or less than 1,000,000 Bbls. Thus, the cargo quantity associated with the parcel quantity data 220 may differ from the measured quantity to be transported. The measured quantities will be further described below with reference to the source quantity data 238 and the destination quantity data 240.

The activity data 222 identifies a type of activity that occurs in relation to the cargo. In one embodiment, the activity may be one of load, discharge, or transfer (ship-to-ship transfer). A parcel with a load activity type may also be referred to as a load parcel. Similarly, a parcel with a discharge or transfer activity type may also be referred to as a discharge parcel or transfer parcel, respectively. A load parcel may indicate that cargo is being loaded onto a vessel from a port or another vessel. A discharge parcel may indicate that cargo is being discharged from a vessel to a port or another vessel. A transfer parcel may indicate that cargo is being transferred from one vessel to another vessel. Other types of activities are also envisioned.

The location data 224 identifies the geographic location where the cargo is being loaded, transferred, or discharged. This location may be identified by a port name, a city name, a country name, a latitude/longitude, or the like.

The date data 226 identifies the date that the activity occurs. The date data 226 may further include information such as the bill of lading date, which represents the date the cargo was originally loaded onto the vessel, and an outturn date, which represents the date the cargo was discharged or will be discharged. The date data 226 may comprise other dates as deemed appropriate or helpful to group parcels and calculate loss. For example, the date data 226 may include an inspection date, contract date, and the like.

The vessel data 228 identifies the vessel transporting the cargo. The vessel data 228 may comprise the name of the vessel or some other uniquely identifying information about the vessel. In addition, the vessel data 228 may include predecessor vessel data. In a ship-to-ship transfer, the cargo is discharged from a predecessor vessel and loaded to a successor vessel. The predecessor vessel data identifies the predecessor vessel that previously transported the cargo. In an embodiment, one or more larger vessels may transfer cargo to one or more smaller vessels. In another embodiment, one or more smaller vessels may transfer cargo to one or more larger vessels. In this context, the larger vessel may be referred to as a mother vessel and the smaller vessel or vessels may be referred to as a daughter vessel or daughter vessels.

The relationship data 230 corresponds to a relationship between different parcels. The relationship data 230 helps identify which parcels should be associated together as part of a group of parcels or as part of the same voyage. A group of related parcels may create a voyage. In one embodiment, there are at least two types of relationships between parcels: predecessor and successor. A predecessor parcel indicates a parcel that precedes the current parcel, and may be so identified using the bill of lading date, outturn date, or other information. In one embodiment, a predecessor parcel indicates a parcel that chronologically precedes the current parcel according to a date associated with the date data 226 (i.e., bill of lading date or outturn date). A successor parcel indicates a parcel that follows the current parcel. In one embodiment, a successor parcel may be identified by the bill of lading date, outturn date, or other information. In one embodiment, a parcel may have one or more predecessor parcels and one or more successor parcels associated therewith. Accordingly, in such an embodiment, the relationship data 230 reflects the one or more predecessor parcels and the one or more successor parcels related to the parcel.

The transportation mode data 232 identifies a transportation mode by which the cargo is transported. In one embodiment, the transportation data may be one of marine, land, or air.

The cargo ID data may represent a unique identifier for cargo over the course of a voyage. In one embodiment, the cargo ID may be used to group and order parcels, validate the group of parcels to determine a voyage, and to calculate loss.

The inspector data may represent the inspector that supervised the load, transfer, or discharge. In one embodiment, the inspector data may be used to group and order parcels, validate the group of parcels to determine a voyage, and to calculate loss.

The trip ID data may represent a unique identifier for a voyage or trip. In one embodiment, the trip ID may be used to group and order parcels, validate the group of parcels to determine a voyage, and to calculate loss.

The ownership data may represent the owner of the cargo being transported by the vessel. In one embodiment, the ownership data may be used to group and order parcels, validate the group of parcels to determine a voyage, and to calculate loss.

In an illustrative embodiment, the parcel data 214 may also include parcel quantity data 234. In an alternative embodiment, the parcel quantity data 234 may be separate from the parcel data 214. The parcel quantity data 234 may include a worksheet ID 236, the parcel ID 216, shore or source quantity data 238, and vessel or destination quantity data 240. The worksheet ID 236 represents a unique identifier identifying the information associated with the parcel quantity data 234. Similar to the parcel data 214, the parcel quantity data 234 may be used by the cargo management system 106 to identify, group, match, order, validate and/or otherwise organize the various parcels that are received by the cargo management system 106, as well as to calculate loss. After a nomination for one or more parcels has been created and an inspection of the parcels completed, an inspector may enter the parcel quantity data 234 into a client computing device 102. Alternatively, a different user may enter the parcel quantity data 234. In one embodiment, the nomination is created and at least part of the parcel data 214, including the parcel quantity data 234, may be entered at the same time. In another embodiment, parcel data 214 is entered during the creation of the nomination, and the parcel quantity data 234 is entered at a different time by an inspector. The client computing device 102 may then transmit the parcel quantity data 234 to the cargo management system 106. The cargo management system 106 may then update the parcel data 214 stored in the data storage device 114 accordingly. In an alternative embodiment, where the parcel quantity data 234 is separate from the parcel data 214, the parcel quantity data 234 may be linked to the parcel data 214.

The shore, or source, quantity data 238 corresponds to the quantity of cargo at the source before load, transfer, or discharge. If the source is a port, then the source quantity data 238 represents the quantity of cargo at the port prior to loading. If the source is a vessel, then the source quantity data 238 may include the quantity of cargo at the vessel before and after a load, before and after a transfer, and/or before and after a discharge. The cargo quantity of cargo on the vessel before loading may also be referred to as on board quantity (OBQ). The cargo quantity of cargo on a vessel after discharge may also be referred to as remaining on board quantity (ROB).

The vessel, or destination, quantity data 240 corresponds to the quantity of cargo at the destination after load, transfer, or discharge. If the destination is a port, then the destination quantity data 240 corresponds to the quantity of cargo at the port after discharging. If the destination is a vessel, then the destination quantity data 240 may include the quantity of cargo at the vessel before and after a load, before and after a transfer, and/or before and after a discharge. The cargo quantity of cargo on the vessel before loading may also be referred to OBQ. The cargo quantity of cargo on a vessel after discharge may also be referred to as ROB.

With further reference to FIG. 2, the data storage device 114 may also store loss data 210. The loss data 210 represents the losses associated with a parcel (parcel level loss), a group of parcels, or one or more voyages. The loss data may include, but is not limited to voyage level loss data 242, load loss data 244, discharge loss data 246, in-transit loss data 248, on board quantity/remaining on board (OBQ/ROB) loss data 250, and other loss data 252.

The loss data s 242-252 are associated with the different types of losses, some of which include load/discharge loss, in-transit loss, on board quantity/remaining on board (OBQ/ROB) loss and voyage level loss, which will be described in greater detail hereafter with reference to FIG. 3. Although not illustrated in FIG. 2, the loss data may comprise additional data, including but not limited to loss data, percentage loss data, and loss identifiers. The percentage of loss data is associated with the loss data and may represent the percentage of total loss attributed to a particular loss. The loss identifiers associated with the different losses represent unique identifiers associated with the different losses.

Figure 3:
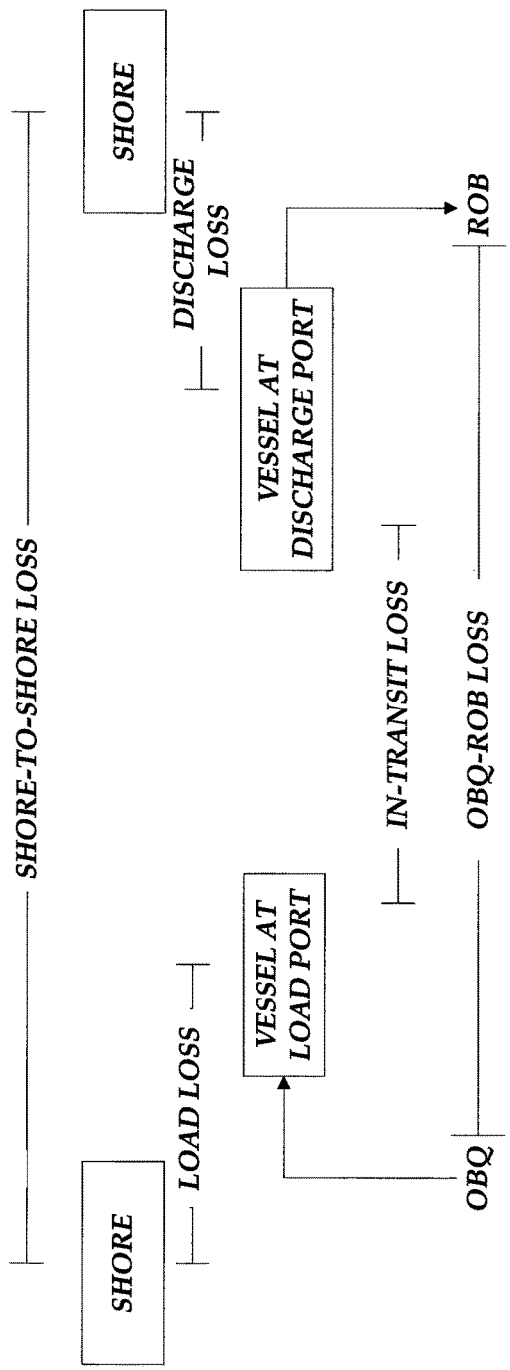
FIG. 3 is a block diagram illustrative of some of the types of losses that are generally associated with a voyage and managed by the cargo management system of FIG. 1.
Figure 4:
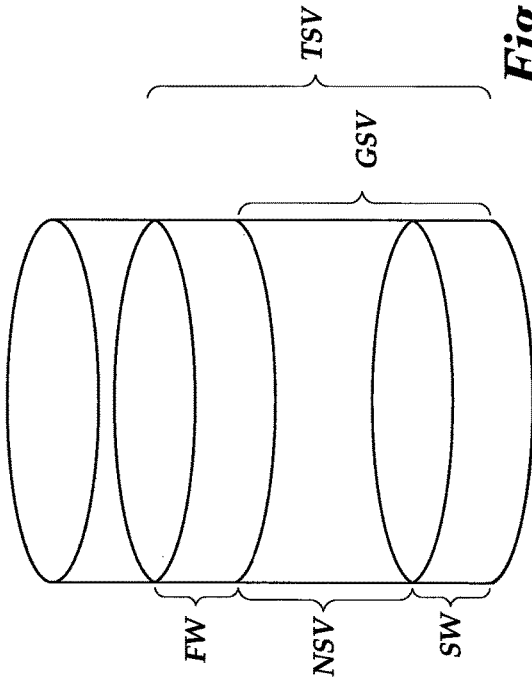
FIG. 4 is a block diagram illustrative of the different volumes that may be calculated for cargo in a vessel.

FIGS. 3 and 4 are block diagrams illustrative of the different types of losses associated with a voyage, and the different volumes or quantities of cargo associated with a vessel. These figures will now be described in detail.

FIG. 3 is a block diagram illustrative of some of the types of losses that are generally associated with a voyage. The losses illustrated in FIG. 3 include load/discharge loss, in-transit loss, voyage level loss and on board quantity/remaining on board (OBQ/ROB) loss. In addition, the cargo management system 106 may calculate other types of loss such as net standard volume (NSV) loss, gross standard volume (GSV) loss, total calculated volume (TCV) loss, water loss, water and sediment loss, ship loss, etc. One skilled in the art will appreciate that the disclosed embodiments and examples given with respect to the types of loss that may be calculated by the cargo management system 106 should not be construed as limiting. It is envisioned that the cargo management system 106 may calculate additional or different types of loss.

Load loss represents the difference between the quantity of cargo at a source before the load and the quantity of cargo at a destination after the load. For example, to calculate the load loss, the source quantity of cargo is compared to the destination quantity of cargo of a load parcel. In one embodiment, the quantity of cargo on shore before loading is compared with the quantity of cargo on the vessel after loading. The difference between the two represents the load loss.

Discharge loss represents the difference between the quantity of cargo at a source before the discharge and the quantity of cargo at a destination after the discharge. For example, the discharge loss may be calculated by comparing the source quantity of cargo with the destination quantity of cargo of a discharge parcel. In one embodiment, the quantity of cargo on the shore after discharge is compared to the quantity of cargo on a vessel before discharge. The difference between the two represents the discharge loss.

In-transit loss represents the difference between a vessel's quantities of cargo after loading at an initial source location and before discharging at a destination location. For example, to calculate the in-transit loss, the destination quantity of cargo of a load parcel is compared with the source quantity of cargo of a discharge parcel. In one embodiment, the quantity of cargo on the vessel after loading at a source location is compared with the quantity of cargo on the vessel before discharging at a destination location. The difference between the two represents the in-transit loss.

In some embodiments, there may be multiple load/discharge points associated with an in-transit loss. In these embodiments, the quantity of cargo on the vessel after loading at a first source location is compared with the quantity of cargo on the vessel before the next load/discharge at the second location. The quantity of cargo on the vessel after load/discharge at the second location is then compared with the quantity of cargo on the vessel before load/discharge at a third location, and so on until the quantity of cargo at the last discharge point has been compared to the quantity of cargo at the previous load/discharge location. Accordingly, in-transit loss may be generated for each segment and/or from the commencement to conclusion of the in-transit state to generate a total in-transit loss.

Voyage level loss represents the difference between the source quantity of cargo of the first load parcel and the destination quantity of cargo of the last discharge parcel. In one embodiment, the quantity of cargo at the first source location before loading is compared with the quantity of cargo at the final destination location after discharge.

OBQ/ROB loss represents the difference between the quantity of cargo on the vessel prior to an initial load and the quantity of cargo left on the vessel after the last discharge.

The loss data associated with the various losses described above may be used by the cargo management system 106 to group, match, order and otherwise organize the various parcels, voyage legs, and voyages.

FIG. 4 is a block diagram illustrative of the different volumes or quantities of cargo that may be measured for a vessel. These volumes include, but are not limited to, total calculated volume (TCV), gross standard volume (GSV), net standard volume (NSV), remaining on board (ROB), on board quantity (OBQ), free water (FW), and sediment and water (S&W). These volumes may constitute the measurements taken by an inspector to help calculate loss.

Various formulas may be used by the cargo management system 106 to determine volume and loss. Among these formulas, some illustrative, non-limiting examples include:
Parcel Level Loss Formulas
Free Water Free Water=TCV−GSV Sediment and Water Sediment & Water=GSV−NSV Load Difference
Shore (Source) to Vessel (Destination):

Load Difference=TCV After Loading−Bill of Lading TCV $$\text{Load Difference \%} = \frac{\text{TCV After Loading} - \text{Bill of Lading } TCV}{\text{Bill of Lading } TCV} \times 100\%$$

Mother Vessel (Source) to Daughter Vessel (Destination):

Load Difference=TCV After Loading−(TCV Before Discharge−ROB TCV)

$$\text{Load Difference \%} = \frac{\text{TCV After Loading} - \left(\begin{array}{c}\text{TCV Before Discharge}-\\ \text{ROB } TCV\end{array}\right)}{\left(\begin{array}{c}\text{TCV Before Discharge}-\\ \text{ROB } TCV\end{array}\right)} \times 100\%$$

Discharge Difference
Vessel (Source) to Shore (Destination):

Discharge Difference=Outturn TCV−TCV Before Discharge $$\text{Discharge Difference \%} = \frac{\text{Outturn } TCV - \text{TCV Before Discharge}}{\text{TCV Before Discharge}} \times 100\%$$

Daughter Vessel (Source) to Mother Vessel (Destination):

Discharge Difference=(TCV After Loading−OBQ TCV)−TCV Before Discharge

Discharge Difference % =

$$\frac{\left(\begin{array}{c}\text{TCV After Loading}-\\ \text{OBQ } TCV\end{array}\right) - \text{TCV Before Discharge}}{\text{TCV Before Discharge}} \times 100\%$$

Load Loss
(VEF and OBQ Corrected Load Difference)
Shore (Source) to Vessel (Destination):

TCV Received=TCV After Loading−OBQ TCV

Theoretical Load Loss=[(TCV After Loading−OBQ TCV)/VEF]

Load Loss=[(TCV After Loading−OBQ TCV)/VEF]−Bill of Lading TCV

Load Loss % =

$$\frac{\left[\left(\begin{array}{c}\text{TCV After Loading}-\\ \text{OBQ } TCV\end{array}\right)\middle/ VEF\right] - \text{Bill of Lading } TCV}{\text{Bill of Lading } TCV} \times 100\%$$

Mother Vessel (Source) to Daughter Vessel (Destination):

Load Loss=[(TCV After Loading−OBQ TCV)/ VEF]−(TCV Before Discharge−ROB TCV)

$$\text{Load Loss \%} = \frac{\left[\binom{TCV \text{ After Loading}-}{OBQ \text{ } TCV}\right/VEF\bigg] - \binom{TCV \text{ Before Discharge}-}{ROB \text{ } TCV}}{TCV \text{ Before Discharge} - ROB \text{ } TCV} \times 100\%$$

Discharge Loss
Vessel (Source) to Shore (Destination):

TCV Delivered=TCV Before Discharge−ROB TCV

Theoretical Discharge Loss=[(TCV Before Discharge−ROB TCV)/VEF]

Discharge Loss=Outturn TCV−[(TCV Before Discharge−ROB TCV)/VEF]

Discharge Loss % =

$$\frac{\text{Outturn } TCV - \left[\binom{TCV \text{ Before Discharge}-}{ROB \text{ } TCV}\right/VEF\bigg]}{\text{Outturn } TCV} \times 100\%$$

Daughter Vessel (source) to Mother Vessel (destination):

Discharge Loss %=(OBQ TCV−TCV After Loading)−[(TCV Before Discharge−ROB TCV)/ VEF]

$$\text{Discharge Loss \%} = \frac{(OBQ \text{ } TCV - TCV \text{ After Loading}) - \left[\binom{TCV \text{ Before Discharge}-}{ROB \text{ } TCV}\right/VEF\bigg]}{OBQ \text{ } TCV - TCV \text{ After Loading}} \times 100\%$$

Voyage Level Loss Formulas
NSV Loss

NSV Loss=Outturn NSV−Bill of Lading NSV $$NSV \text{ Loss \%} = \frac{\text{Outturn } NSV - \text{Bill of Lading } NSV}{\text{Bill of Lading } NSV} \times 100\%$$

GSV Loss

TCV Loss=Outturn GSV−Bill of Lading GSV $$TCV \text{ Loss \%} = \frac{\text{Outturn } GSV - \text{Bill of Lading } GSV}{\text{Bill of Lading } GSV} \times 100\%$$

TCV Loss

TCV Loss=Outturn TCV−Bill of Lading TCV $$TCV \text{ Loss \%} = \frac{\text{Outturn } TCV - \text{Bill of Lading } TCV}{\text{Bill of Lading } TCV} \times 100\%$$

OBQ−ROB Difference

OBQ−ROB Difference=OBQ TCV−ROB TCV $$OBQ - ROB \text{ Difference \%} = \frac{OBQ \text{ } TCV - ROB \text{ } TCV}{TCV \text{ After Loading}} \times 100\%$$

Water Loss

Water Loss=Bill of Lading FW−Outturn FW $$\text{Water Loss \%} = \frac{\text{Bill of Lading } FW - \text{Outturn } FW}{\text{Bill of Lading } TCV} \times 100\%$$

Sediment and Water Loss

S&W Loss=Bill of Lading S&W−Outturn S&W $$S\&W \text{ Loss \%} = \frac{\text{Bill of Lading } S\&W - \text{Outturn } S\&W}{\text{Bill of Lading } TCV} \times 100\%$$

Ship Loss−TCV

TCV Ship Loss=TCV Before Discharge−TCV After Loading $$TCV \text{ Ship Loss \%} = \frac{TCV \text{ Before Discharge} - TCV \text{ After Loading}}{TCV \text{ After Loading}} \times 100\%$$

Ship Loss−GSV

GSV Ship Loss=GSV Before Discharge−GSV After Loading $$GSV \text{ Ship Loss \%} = \frac{GSV \text{ Before Discharge} - GSV \text{ After Loading}}{GSV \text{ After Loading}} \times 100\%$$

Ship Loss−Received vs. Delivered

Received vs. Delivered Loss=TCV Delivered−TCV Received $$GSV \text{ Ship Loss \%} = \frac{TCV \text{ Delivered} - TCV \text{ Received}}{TCV \text{ Received}} \times 100$$

Figure 5A:
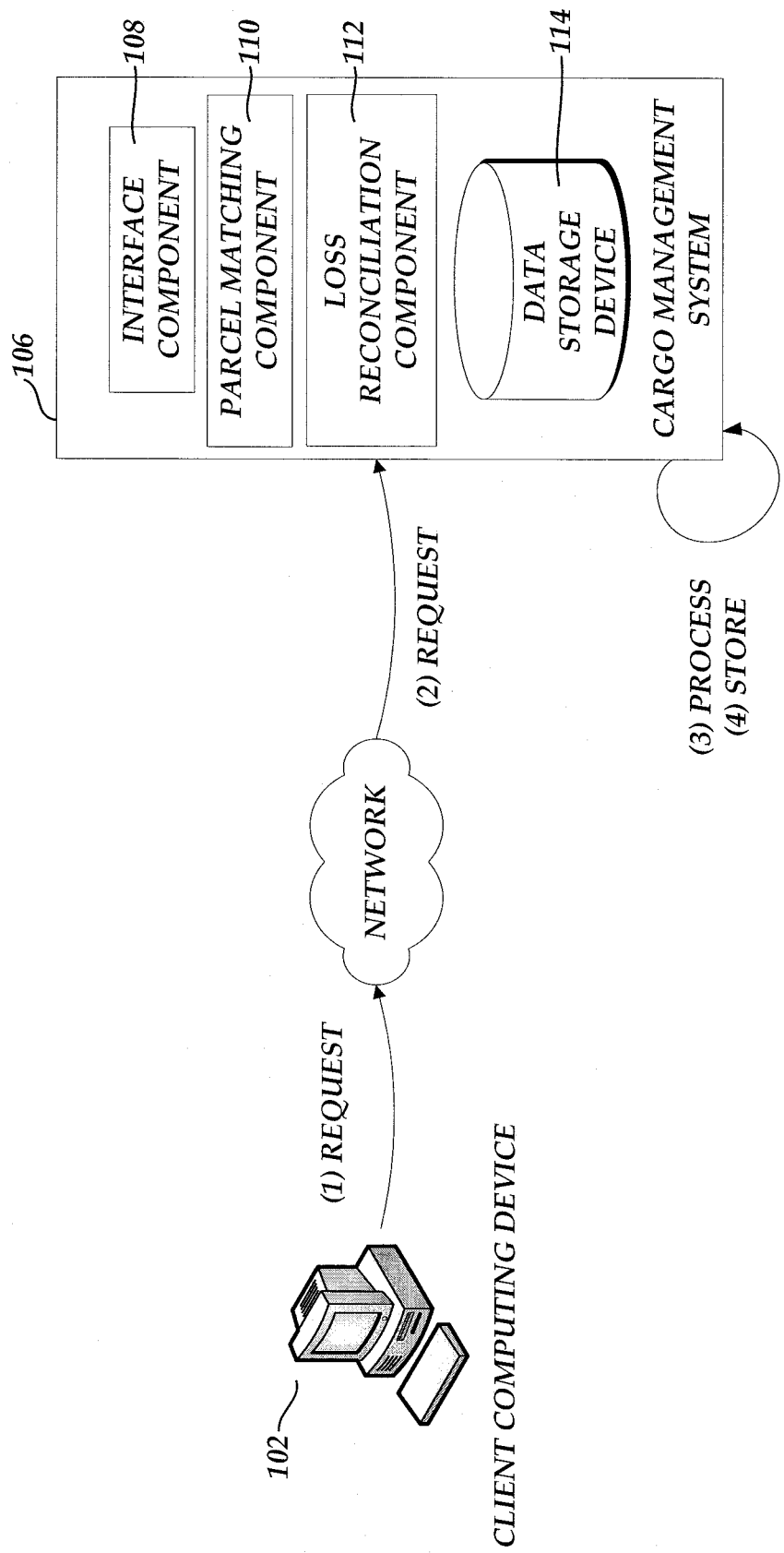
FIGS. 5A-C are state diagrams illustrative of the interaction between the various components of the cargo management environment of FIG. 1.
Figure 5B:
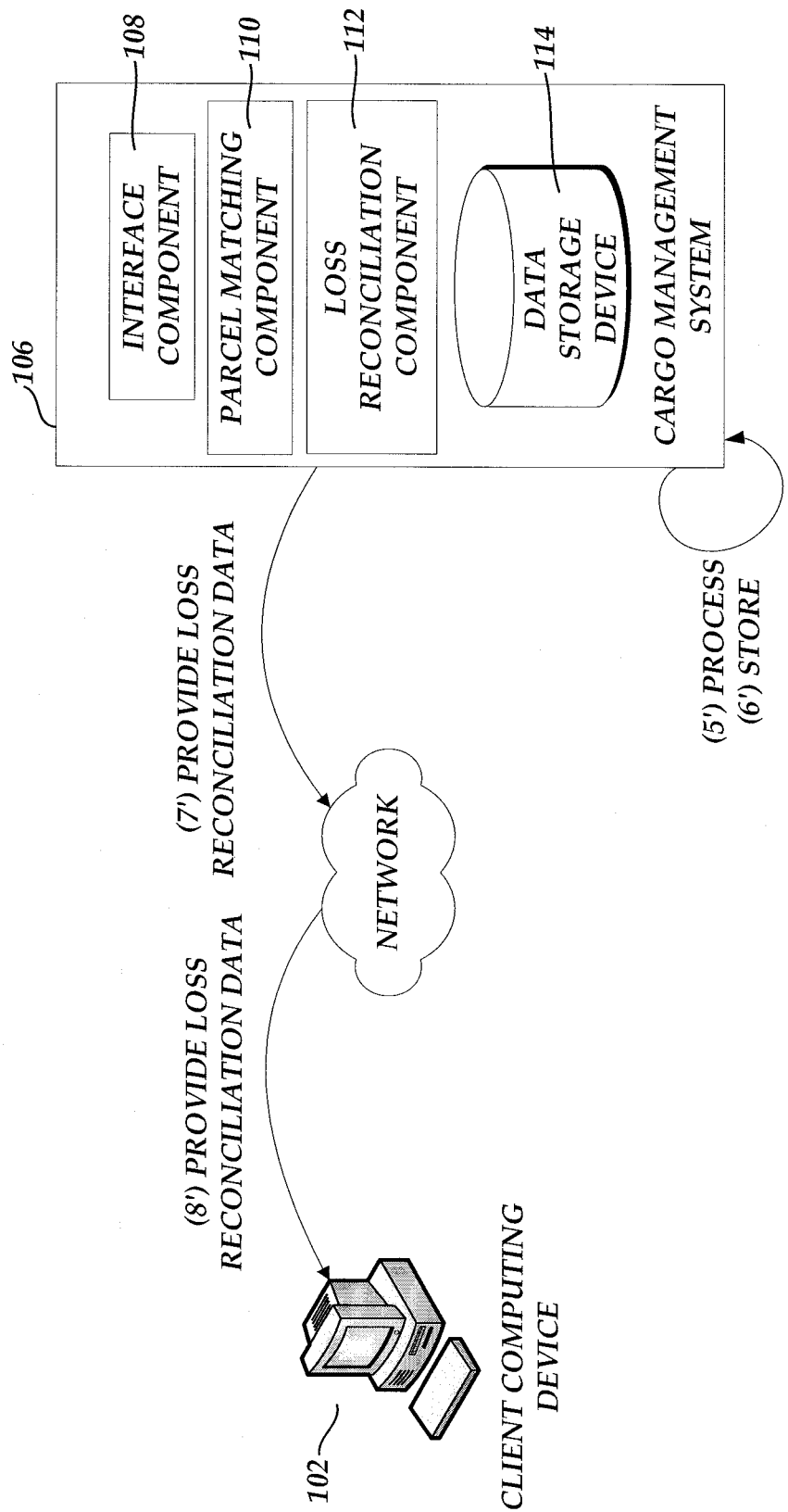
Figure 5C:
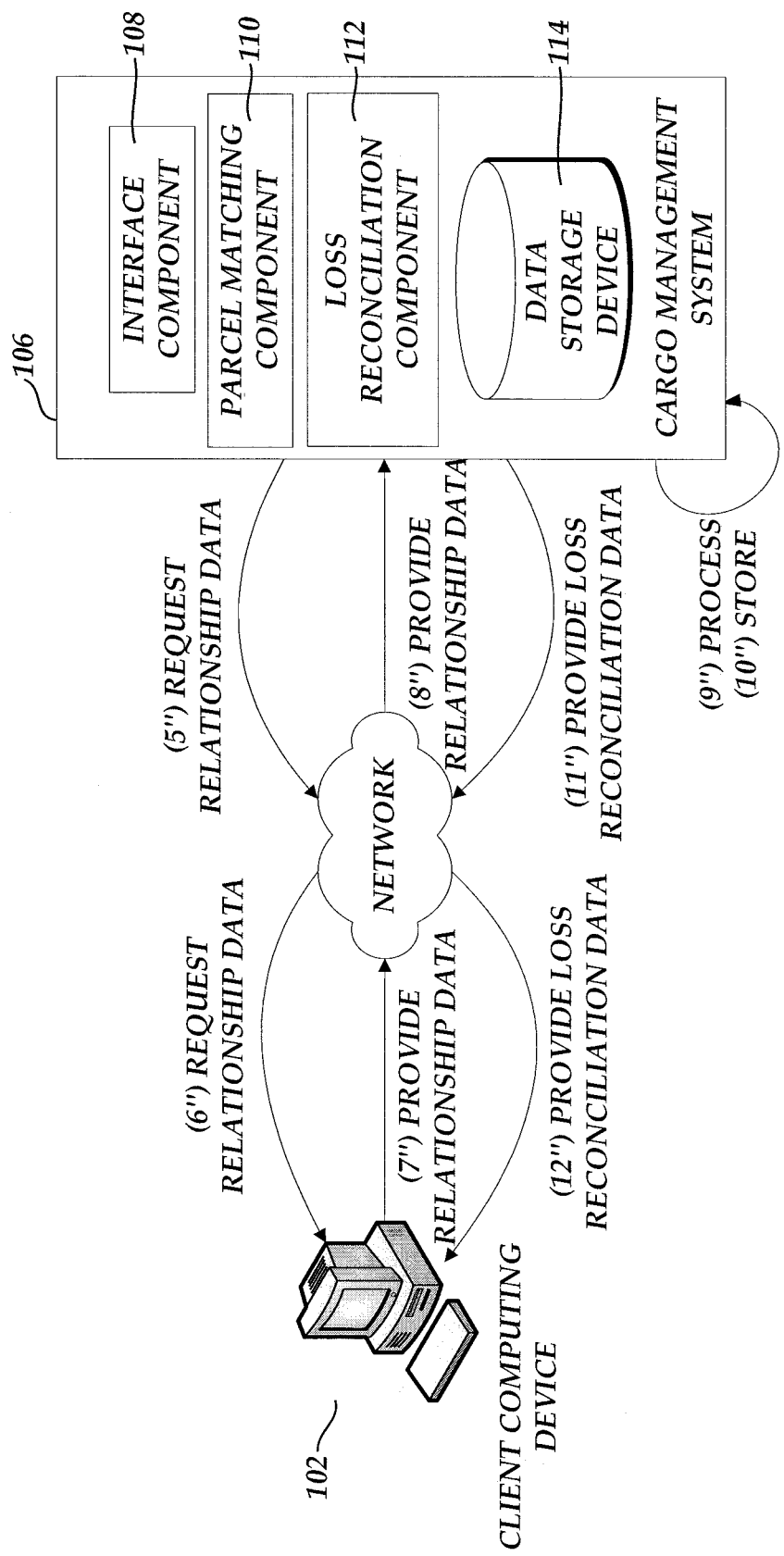

With reference now to FIGS. 5A-5C, the interaction between the various components of the cargo management environment 100 of FIG. 1 is illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

With reference to FIG. 5A, a client computing device 102 initiates a request to the cargo management system 106. For example, the request from the client computing device 102 may correspond to a submission of a nomination, parcel data, including parcel quantity data, corresponding to a parcel, or the like. In addition, or alternatively, the request from the client may correspond to a request for a specific loss report, invoice, parcel grouping, or the like. The request may also, or alternatively, correspond to a client request to store data, such as an inspection report, logs, or the like, and associate this data with a particular parcel. Furthermore, the request may correspond to a request for information or a request to perform a calculation with respect to a particular parcel or voyage. In another embodiment, the submission of parcel data as part of the request may also automatically trigger other processing at the cargo management system 106 beyond storage of parcel data. For example, the submission of the parcel data may cause the cargo management system 106 to automatically group the parcels associated with the submitted parcel data with other related parcels to form a voyage, and update any loss calculations based on the additional data.

In general, the request from the client computing device 102 is to be interpreted broadly and may correspond to any number of communications, whether carried out automatically or at the specific request of a user, between the client computing device 102 and the cargo management system 106 without departing from the spirit and scope of the description.

Upon receiving the request via the communication network 104, the cargo management system 106 processes the request using various components of the cargo management system 106, and optionally stores data associated with the request or the processing thereof. As will be described in further detail below, in one embodiment, the cargo management system 106 may utilize parcel data 214 provided in the submission from the client computing device 102 to identify other related parcels that may be grouped with the submitted parcel to form a voyage. As will also be explained in greater detail below with reference to FIGS. 6 and 7, the cargo management system 106 then performs a first validation, also referred to as a parcel validation, on the grouped parcels to verify that the identified parcels may indeed be grouped together. In an alternative embodiment, instead of the cargo management system 106 initially identifying other parcels that may be grouped with the submitted parcel, this data may be provided to the cargo management system 106 by a user via the client computing device 102.

With continued reference to FIG. 5A, and in an illustrative embodiment, the cargo management system 106 stores data associated with the request, such as parcel data, including parcel quantity data, and any additional data generated during the processing of the request in the data storage device 114. It will be appreciated by one skilled in the art and others that the processing and storing functions performed by the cargo management system 106 can be repeated as necessary and performed in any order. For example, storage of data associated with the request and/or processing of the request can occur once all processing has been completed, intermittently with processing, or prior thereto. The cargo management system 106 may also provide the results of its processing to the client computing device 102.

With reference now to FIG. 5B, in an illustrated embodiment, the cargo management system 106 further processes a group of parcels associated with the submitted request without receiving additional data from the client computing device 102. As will be explained in greater detail below with respect to FIGS. 6, 8, and 9, the cargo management system 106 determines the relationship for each parcel in the group, performs a second validation, also referred to as voyage validation, on the group of parcels, and then calculates the various losses associated with the group of parcels.

With further reference to FIG. 5B, as similarly set forth above, the cargo management system 106 may also store data associated with the processing of the group of parcels. It will be appreciated by one skilled in the art and others that the processing and storing functions performed by the cargo management system 106 can be repeated as necessary and performed in any order. For example, storage of data associated with the processing of the group of parcels can occur once all processing has been completed, intermittently with processing, or prior thereto. The cargo management system 106 may then provide at least a portion of any results, such as the calculated loss reconciliation data, to the client computing device 102 via the communication network 104. Additional data may also be provided to the client computing device 102, such as a summary of the voyage including ports visited, vessels used, and losses associated with each port and/or vessel associated with the voyage. The additional data may further include a summary of related voyages, reports reflecting the total losses associated with a voyage or related voyages, reports reflecting trends of losses associated with a particular vessel, port or voyage or similar voyages, reports reflecting the average or total losses associated with various vessels, and ports, and the like.

With reference now to FIG. 5C, as an alternative to the cargo management system 106 processing the group of parcels to determine relationship data 230 for each parcel in the group and then automatically calculating and providing loss reconciliation data based on the relationship data 230 as generally described in reference to FIG. 5B, the cargo management system 106 requests a user of the client computing device 102 to provide additional data, such as the relationship data 230, before calculating loss. In this embodiment, the cargo management system 106 requests additional information from the client computing device 102. In one embodiment, the information requested is relationship data 230 for each parcel in the group of parcels associated with the original request as discussed above with reference to FIG. 5A. Specifically, the relationship data 230 may be information identifying any predecessors and/or successors parcels for each parcel in the group. As will be described in greater detail with reference to FIG. 11, the client computing device 102 may present the group of parcels received from the cargo management system 106 via a user interface displayed on a monitor, or other display device, associated with the client computing device 102. A user associated with the client computing device 102 may then select the relationship data 230 for each parcel in the group via the user interface. The client computing device 102 provides such selected relationship data 230 to the cargo management system 106 via the communication network 104. The cargo management system 106 receives and processes the relationship data 230 from the client computing device 102. In one embodiment, as similarly set forth above, once relationship data 230 for the group of parcels has been identified and received at the cargo management system 106, the cargo management system 106 proceeds with performing the second validation and calculating the various losses associated with the group of parcels.

With continued reference to FIG. 5C, and in an illustrative embodiment, the cargo management system 106 may store data associated with the request for relationship data 230, such as relationship data 230, and any additional data generated during the processing of the second validation, and/or calculation of loss associated with the group of parcels in the data storage device 114. It will be appreciated by one skilled in the art and others that the processing and storing functions performed by the cargo management system 106 can be repeated as necessary and performed in any order. For example, storage of data associated with the request for relationship data 230, second validation, and/or calculation of loss associated with the group of parcels can occur once all processing has been completed, intermittently with processing, or prior thereto. The cargo management system 106 may also provide the results of its processing to the client computing device 102.

Upon receiving the relationship data 230, the cargo management system 106 performs additional processing that will be explained in greater detail below with reference to FIGS. 7-9. In general, the cargo management system 106 performs a second validation test routine, or voyage validation, on the group of parcels to create a voyage. The cargo management system 106 may then calculate the various losses associated with the voyage. Upon completing the processing, the received information and any additional information generated during validation and the calculations of loss processing is stored. The cargo management system 106 may then provide the loss reconciliation data to the client computing device 102.

Figure 6:
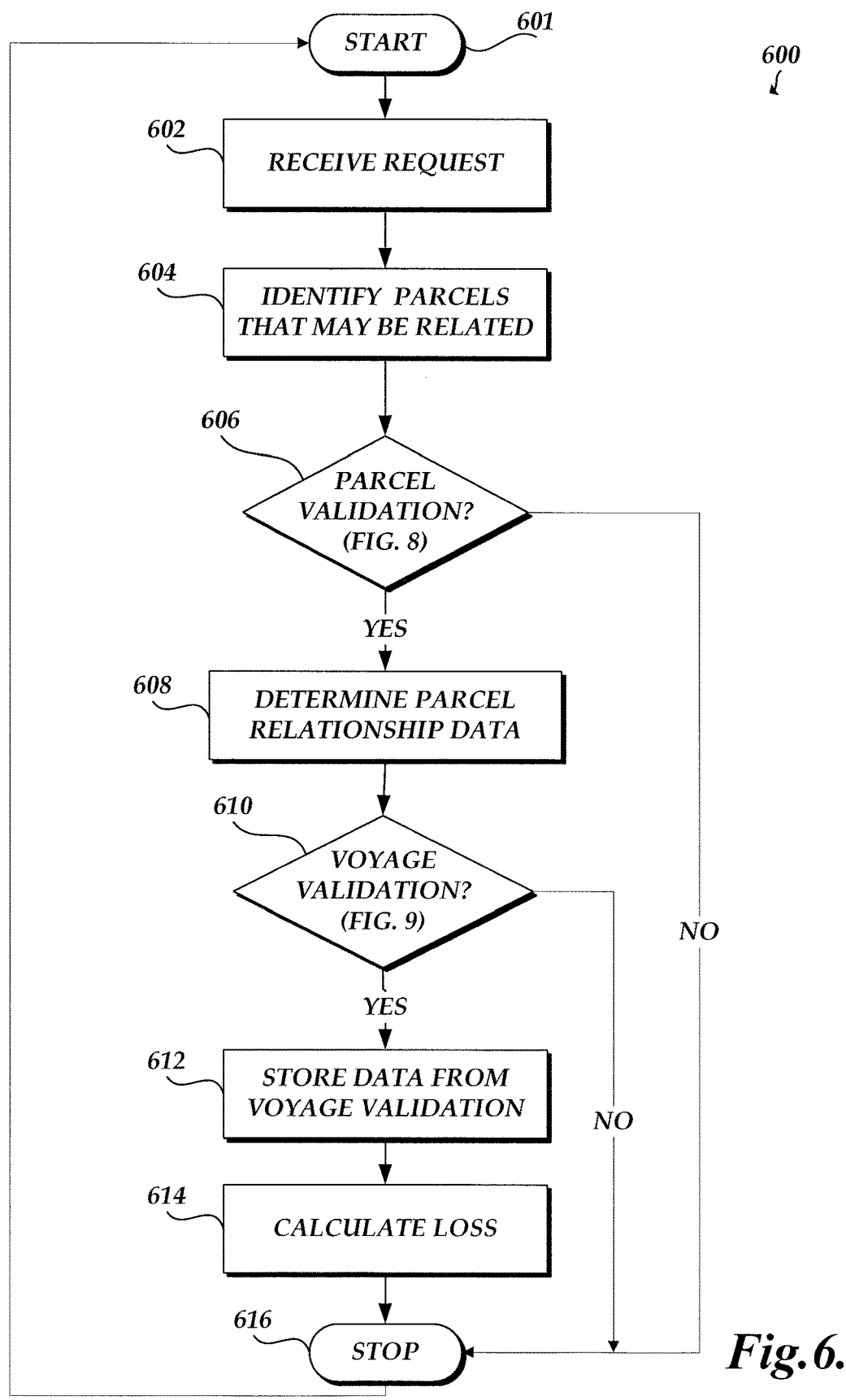
FIG. 6 is a flow diagram illustrative of one embodiment of a routine implemented by the cargo management system of FIG. 1 for automatically grouping parcels, and reconciling the loss associated with the parcels.
Figure 7:
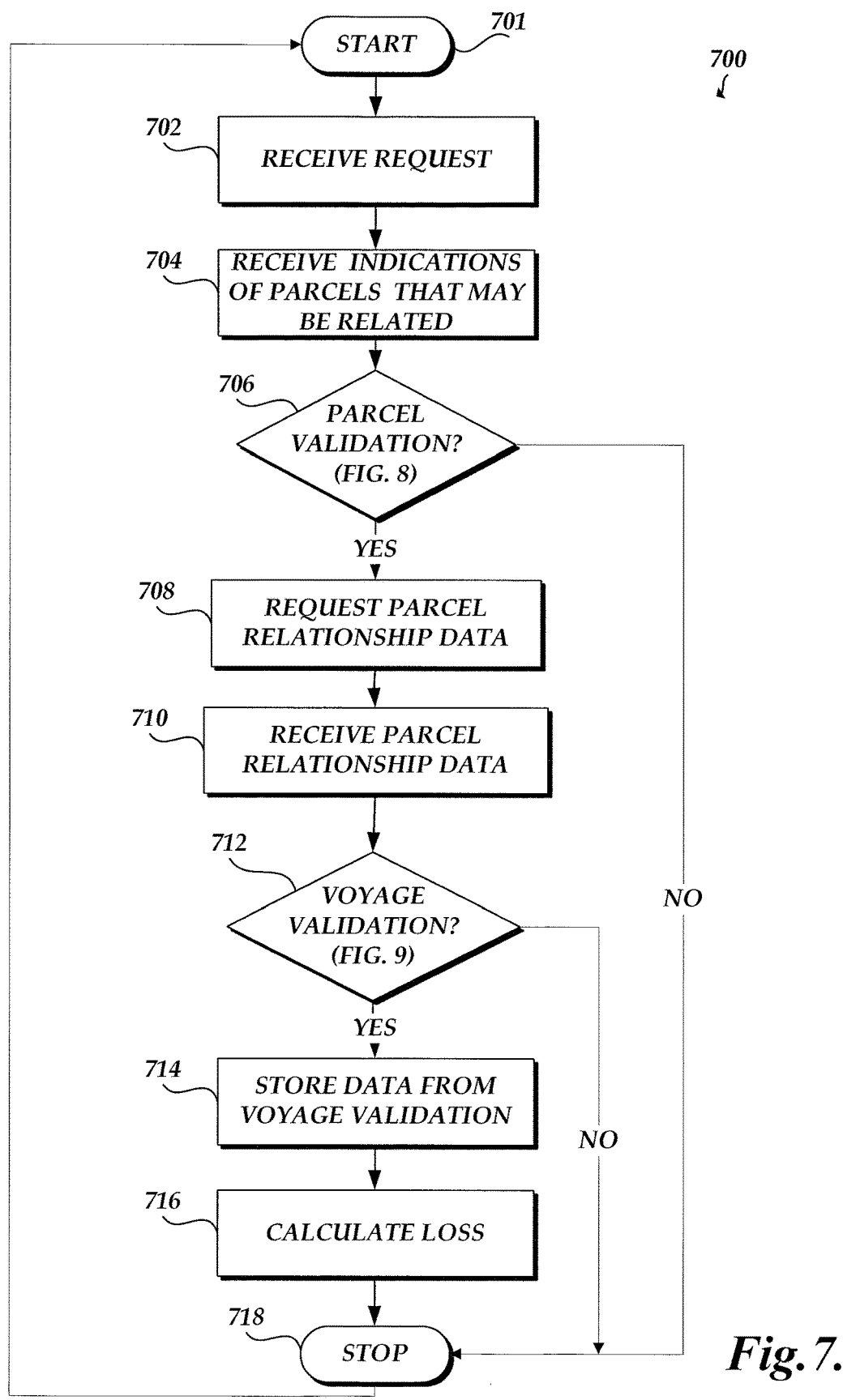
FIG. 7 is a flow diagram illustrative of another embodiment of a routine implemented by the cargo management system of FIG. 1 for manually grouping parcels and reconciling the loss associated with the parcels.
Figure 8:
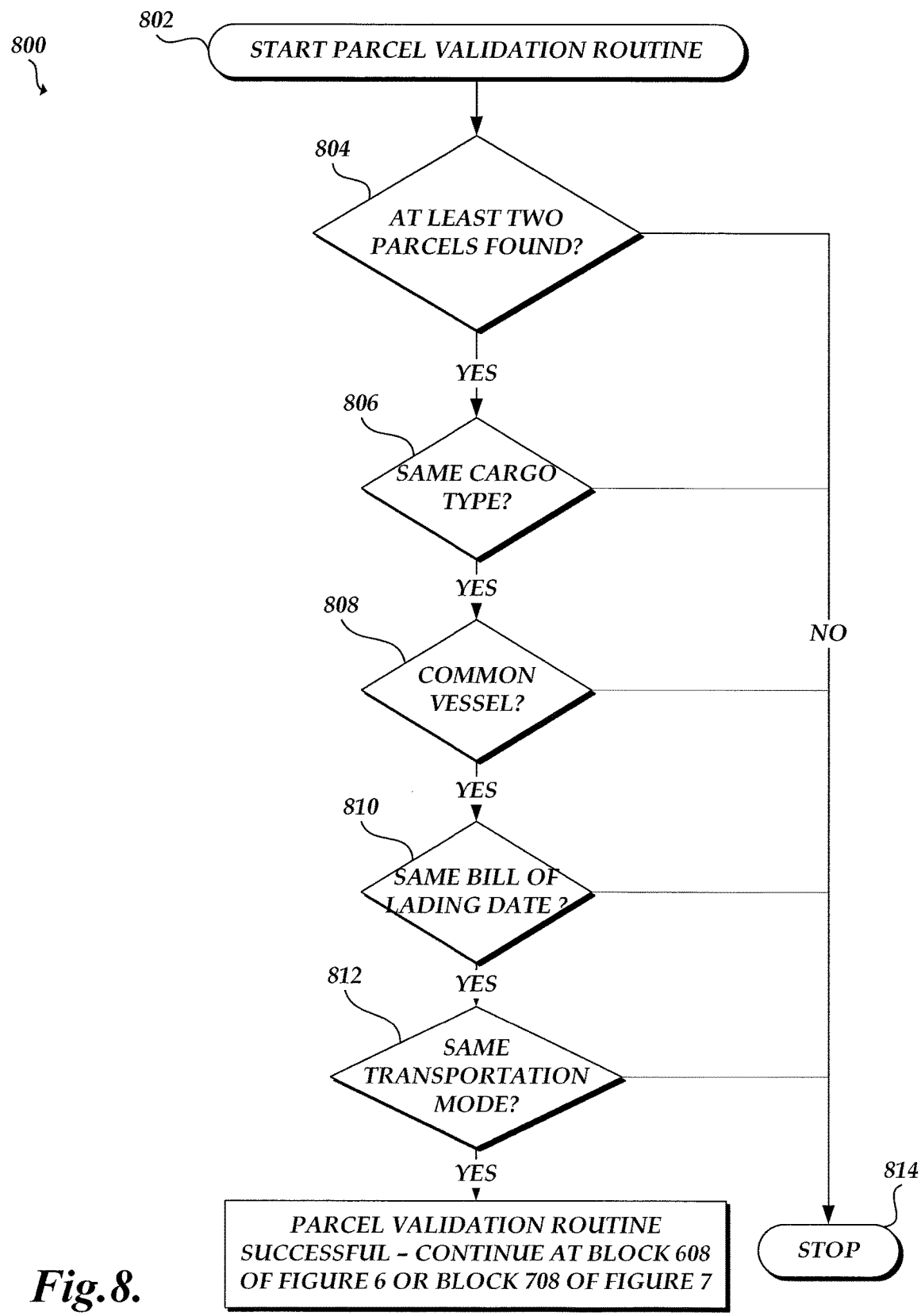
FIG. 8 is a flow diagram illustrative of an embodiment of a parcel validation routine.
Figure 9:
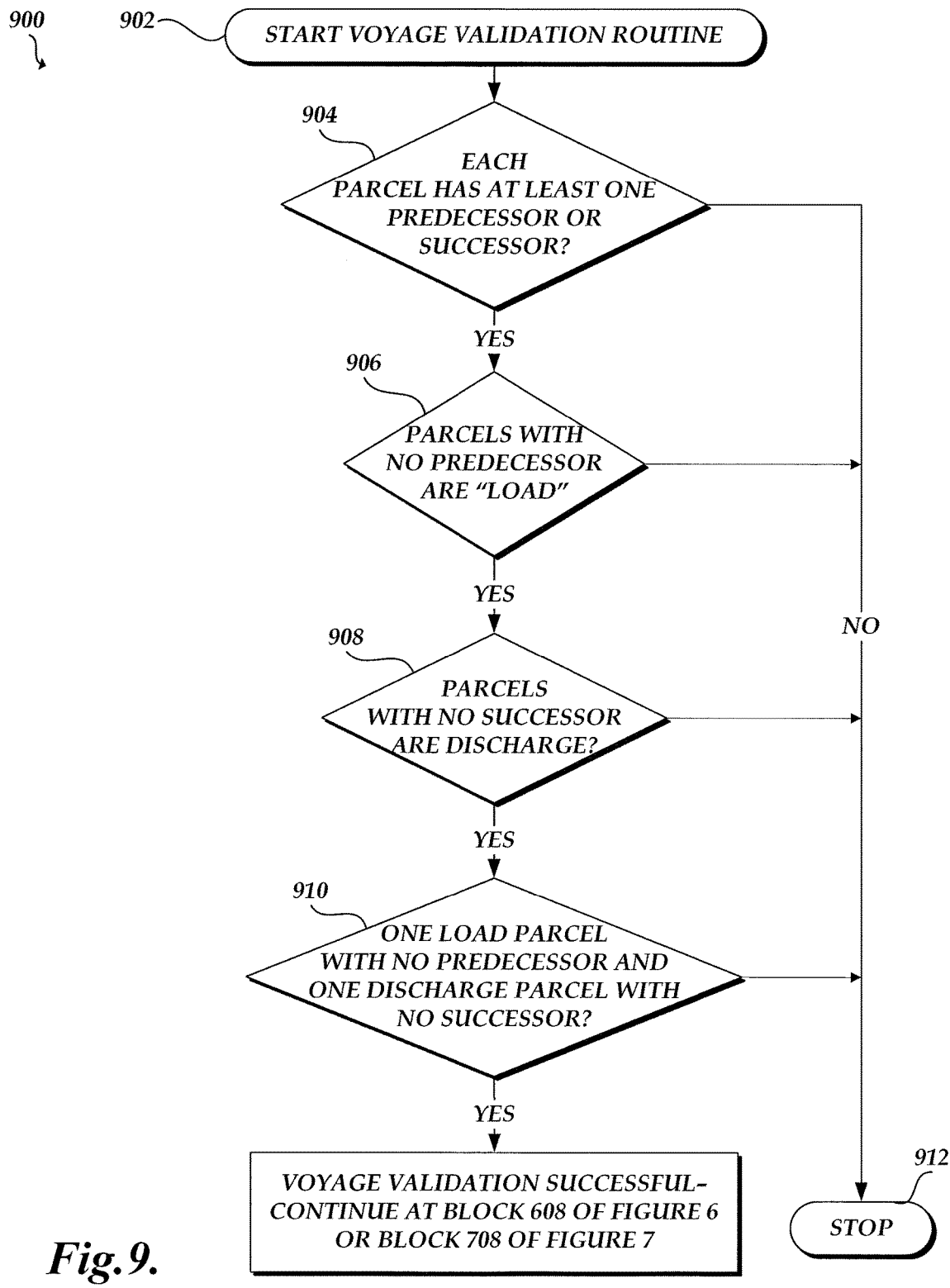
FIG. 9 is a flow diagram illustrative of an embodiment of a voyage validation routine.

FIGS. 6-9 are flow diagrams illustrative of various processes or routines that cargo management system 106 may carry out. FIG. 6 is a flow diagram illustrative of a routine 600 implemented by the cargo management system 106 for processing a client request by automatically determining parcel relationship data 230. FIG. 7 is a flow diagram illustrative of an alternate routine 700 implemented by the cargo management system 106 in which parcel relationship data 230 is determined by a the user of the client computing device 102 and provided to the cargo management system 106 for further processing. FIG. 8 is a flow diagram illustrative of a routine 800 implemented by the cargo management system 106 for performing the parcel validation provided in flow diagrams of FIGS. 6 and 7. FIG. 9 is a flow diagram illustrative of a routine 900 implemented by the cargo management system 106 for performing the voyage validation also provided in the flow diagrams of FIGS. 6 and 7. The FIGS. 6-9 will now be described in detail.

FIG. 6 is a flow diagram illustrative of one embodiment of a routine 600 implemented by a cargo management system 106 for grouping parcels and reconciling the loss associated with the parcels. For example, routine 600 can apply to embodiments described in reference to FIGS. 5A and 5B. One skilled in the relevant art will appreciate that the elements outlined for routine 600 may be implemented by one or many computing devices/components that are associated with the cargo management system 106. Accordingly, routine 600 has been logically associated as being generally performed by the cargo management system 106, and thus the following illustrative embodiments should not be construed as limiting.

At block 602, the cargo management system 106 receives a request from client computing device 102. As discussed previously, the request may, in one embodiment, correspond to a submission of parcel data 214 and/or parcel quantity data 234 at the client computing device 102. In addition, or alternatively, the request may correspond to a request from the client computing device 102 to identify related parcels, reconcile loss, provide a loss report, or an invoice, or the like.

Upon receiving the request, the cargo management system 106 identifies parcels that may be related and thus grouped at block 604. The cargo management system 106 can identify such parcels to create an identified group of parcels in a number of ways. In one embodiment, the cargo management system 106 may search data storage device 114 to analyze recent parcel data entries, and identify parcels that have similar date data 226, vessel data s 228, or any other data associated with the various stored parcels including, but not limited to cargo type data 218, parcel quantity data 220, location data 224, activity data 222, relationship data 230, transportation mode data 232, and the like.

At decision block 606, the cargo management system 106 performs a first validation, or parcel validation, on the identified group of parcels to confirm that the identified group of parcels are indeed related and thus can form a first-validated group of parcels. Further details with regard to the parcel validation will be provided in relation to FIG. 8 as described below. If the parcel validation is unsuccessful, the routine 600 will stop, as illustrated at block 616. Upon stopping, the routine 600 may return to the start and await a new request. In addition, in one embodiment, although not depicted in FIG. 6, the routine 600 may transmit an error message to the client computing device 102 indicating the reason the validation was unsuccessful. In this, or any other embodiment, the client computing device 102 may override the error and force the cargo management system 106 to validate the group of parcels.

Continuing with the flow diagram of FIG. 6, at block 608 the cargo management system 106 automatically determines relationship data 230 for each parcel in the first-validated group of parcels. As discussed previously, the relationship data 230 may comprise predecessor(s) and/or successor(s) data for each parcel. The determination at block 608 may occur automatically without any further data received from the client computing device 102. In one embodiment, the cargo management system 106 may order the group of parcels chronologically according to a bill of lading date and/or other data from the date data 226 of the parcel data for each parcel in the group. Thereafter, the cargo management system 106 may determine a predecessor and/or successor relationship between the parcels in the group based on different data of the parcel data for each parcel in the group of parcels, such data including, but not limited to, the activity data 222, the date data 226, the vessel data 228, and the like. The cargo management system 106 may use other parcel data to order the parcels in the group of parcels, determine the relationship between these parcels and thus calculate loss as will be described below. For instance, the cargo management system 106 may use a trip ID, cargo ID, ownership data, and the like.

At decision block 610, the cargo management system 106 performs a second validation routine, or voyage validation, on the first-validated group of parcels. Further details with respect to the voyage validation at block 610 will be provided with respect to FIG. 9 as described below. The second validation routine, or voyage validation, may be performed on any number of parcels in the group. The group of parcels may correspond to an entire voyage, or may correspond to a part of a voyage. Thus, the voyage validation may be performed on any group of parcels whether or not the group corresponds to an entire voyage. If the parcel validation is unsuccessful, the routine 600 will stop, as illustrated at block 616. Upon stopping, the routine 600 may return to the start and await a new request. In addition, in one embodiment, although not depicted in FIG. 6, the routine 600 may transmit an error message to the client computing device 102 indicating the reason the validation was unsuccessful. In this, or any other embodiment, the client computing device 102 may override the error and force the cargo management system 106 to validate the parcels.

Upon completion of the voyage validation at block 610, data associated with the voyage validation is stored in the storage device, as illustrated at block 612. This data may include the voyage validated group of parcels and any associated data. In addition, information relating to the voyage as a whole may also be stored.

At block 614, the cargo management system 106 calculates (or reconciles) any losses associated with the twice validated group of parcels. The losses calculated may be any one of the losses mentioned above with regards to FIGS. 3 and 4. Other losses may also be calculated as also discussed above. Although not depicted in FIG. 6, the cargo management system 106 provides at least a portion of the calculated loss data to the client computing device 102. The routine 600 stops as illustrated at block 616. Upon stopping, the routine 600 may return to the start and await a new request. In addition, the routine 600 may transmit a message indicating successful completion of the loss reconciliation to the client computing device 102.

FIG. 7 is a flow diagram illustrative of another embodiment of a routine 700 implemented by a cargo management system 106 for grouping parcels and reconciling the loss associated with the parcels. Routine 700 can apply to embodiments described in reference to FIGS. 5A and 5C. As will be described further below, routine 700 is generally similar to routine 600 of FIG. 6 with the exception that the user of the client computing device 102 provides the relationship data 230 to the cargo management system 106 for the group of parcels instead of being an automated determination of the cargo management system 106.

One skilled in the relevant art will appreciate that elements outlined for routine 700 may be implemented by one or many computing devices/components that are associated with the cargo management system 106. Accordingly, routine 700 has been logically associated as being generally performed by the cargo management system 106, and thus the following illustrative embodiments should not be construed as limiting.

Block 702 is similar to block 602 of FIG. 6. At block 702, the cargo management system 106 receives a request from client computing device 102.

At block 704, the cargo management system 106 receives from the client computing device 102 indications of parcels that may be related. In one embodiment, the client computing device 102 identifies the parcels that may be grouped and transmits the parcels to the cargo management system 106 via the communication network 104. Although not illustrated in FIG. 7, a user associated with the client computing device 102 may select the parcels that may be related using a user interface. The user interface may comprise a graphical user interface (GUI) for ease of use. The GUI may provide a user with a list of options, menus, displays, or the like, allowing the user to easily identify the parcels that may be grouped by the cargo management system 106.

At block 706, the cargo management system 106 performs a parcel validation, on the identified group of parcels received from the client computing device 102 to confirm that the identified group of parcels are indeed related and thus can be validated, similar to block 606 of FIG. 6. Further details with regard to the parcel validation will be provided in relation to FIG. 8. If the parcel validation is unsuccessful, the routine 700 will stop, as illustrated at block 718. Upon stopping, the routine 700 may return to the start and await a new request. In addition, in one embodiment, although not depicted in FIG. 7, the routine 700 may transmit an error message to the client computing device 102 indicating the reason the validation was unsuccessful. In this, or any other embodiment, the client computing device 102 may override the error and force the cargo management system 107 to validate the parcels.

Continuing with the flow diagram of FIG. 7, at block 708 the cargo management system 106 requests parcel relationship data 230 for the group of parcels from the client computing device 102 via the communication network 104. As will be discussed in greater detail below with reference to FIG. 11, the client computing device 102 may provide a user associated with the client computing device 102 with a user interface to allow the user to easily identify the relationship between the group of parcels. The user interface may comprise a number of different screens, menus, or fields where the data may be entered.

At block 710, the cargo management system 106 receives relationship data 230 for the parcels from the client computing device 102 via the communication network 104. The relationship data 230 identifies the relationship data 230 for each parcel in the first-validated group of parcels.

At decision block 712, the cargo management system 106 performs a voyage validation similar to that of block 610 of FIG. 6. Further details with respect to the voyage validation will be given hereafter with respect to FIG. 9 as described below. As mentioned previously, the voyage validation may be performed on any group of parcels whether or not the group of parcels constitutes an entire voyage. If the parcel validation is unsuccessful, the routine 700 will stop, as illustrated at block 718. Upon stopping, the routine 700 may return to the start and await a new request. In addition, in one embodiment, although not depicted in FIG. 7, the routine 700 may transmit an error message to the client computing device 102 indicating the reason the validation was unsuccessful. In this, or any other embodiment, the client computing device 102 may override the error and force the cargo management system 106 to validate the parcels.

Blocks 714 and 716 are similar to blocks 612 and 614 of FIG. 6, respectively. At block 714, the cargo management system 106 stores data associated with the voyage validation in the data storage device 114, similar to block 612 of FIG. 6. This data may include the voyage validated group of parcels and any associated data. In addition, information relating to the voyage as a whole may also be stored. At block 716 the cargo management system 106 calculates (or reconciles) any losses associated with the twice-validated group of parcels, similar to block 614 of FIG. 7.

FIG. 8 is a flow diagram illustrative of an embodiment of a routine 800 corresponding to the parcel validation. The parcel validation routines of FIGS. 6 and 7 are provided at decision blocks 606 and 706, respectively. One skilled in the relevant art will appreciate that the elements outlined for routine 800 may be implemented by one or many computing devices/components that are associated with the cargo management system 106. Accordingly, routine 800 has been logically associated as being generally performed by the cargo management system 106, and thus the following illustrative embodiments should not be construed as limiting.

At block 802, the first validation routine, also referred to as parcel validation routine, is initiated. At decision block 804, the cargo management system 106 determines if there are at least two parcels to be validated. If there are not at least two parcels to be validated then routine 800 stops as illustrated at block 814.

If at least two parcels are to be validated, then the cargo management system 106 determines if the parcels have the same parent-level cargo type as provided in the cargo type data 218 of the parcel data 214 and as illustrated at decision block 806. As discussed previously, the parent-level cargo type is generally one of crude, liquid natural gas (LGN), chemical, or products. However, additional parent-level cargo types are envisioned. In addition or alternatively, the cargo management system 106 may determine if the parcels have the same cargo type or parent-level cargo type as provided in the cargo type data 218. If it is determined that the parcels do not share a common parent-level cargo type or cargo type, then routine 800 stops as illustrated at block 814.

If the parcels share the same parent-level cargo type, or cargo type, then the cargo management system 106 determines if the parcels share a common vessel as provided by the vessel data 228 of the parcel data 214 and as illustrated at decision block 808. In determining if the parcels share a common vessel, the cargo management system 106 may also determine if the predecessor vessel data of one parcel corresponds to the vessel data or predecessor vessel data of another parcel. If it is determined that the parcels do not share a common vessel then routine 800 stops as illustrated at block 814.

If the parcels share a common vessel as provided in the vessel data 228 of the parcel data 214, or if the predecessor vessel of one parcel is the same as the vessel or predecessor vessel of another parcel, then the cargo management system 106 determines if the parcels share a common bill of lading date as illustrated at decision block 810. If it is determined that the parcels do not share a common bill of lading date, then routine 800 stops as illustrated at block 814.

On the other hand, if the parcels share a common bill of lading date, then the cargo management system 106 determines if the parcels share a common transportation mode as provided in the transportation mode data 232 of the parcel data 214 and as illustrated at decision block 812. As discussed previously, the transportation mode data 232 may be any one of marine, land, air, or any other type of transportation mode available. If it is determined that the parcels do not share a common transportation mode, then routine 800 stops as illustrated at block 814.

Alternatively, if the parcels share a common transportation mode data 232, then the cargo management system 106 determines that the parcels are validated and either automatically determines a relationship between the grouped parcels, as illustrated at block 608 of FIG. 6, or requests the relationship data 230 for each of the grouped parcels from the client computing device 102, as illustrated at block 708 of FIG. 7.

If one of the foregoing decision blocks 804-812 is unsuccessful as indicated in FIG. 8 by a "No" response to the corresponding decision, the routine 800 stops as illustrated at block 814. As previously described with regards to FIGS. 6 and 7, if the routine 800 stops it may terminate, return to the start and await a new request or generate an error message. The error message may be transmitted to the client computing device 102. In one embodiment, the client computing device 102 may override the error, and force the cargo management system 106 to return a successful validation.

With further reference to FIG. 8, it is to be understood that the order of the decision blocks may be changed without affecting the nature or scope of the description. Furthermore, the cargo management system 106 may make any one or more of the determinations simultaneously or in any order. Thus, in one embodiment, if the parcels share a common (1) parent-level cargo type, (2) vessel (including predecessor vessel), (3) bill of lading date, and (4) transportation mode, then the first validation routine 800 will be considered successful.

In another embodiment the first, or parcel, validation routine 800 may require fewer or more decision blocks. For example, the parcel validation routine 800 may only require that the parcels share a common bill of lading date, cargo ID, owner ID, trip number or vessel to be validated. Alternatively, the parcel validation routine may not require that the parcels share a common bill of lading date. Other embodiments using different data are envisioned without departing from the nature and scope of the description. For example, the cargo management system 106 may not perform the first validation and may only perform the voyage validation, which will be described in greater detail below with reference to FIG. 9. In another embodiment, the cargo management system 106 may only perform the first validation, and may not perform the voyage validation. In such an embodiment, the cargo management system 106 may not obtain additional relationship data 230 for the parcels, or even calculate loss.

FIG. 9 is a flow diagram illustrative of an embodiment of a routine 900, corresponding to the voyage validation process of FIGS. 6 and 7. The voyage validation process of FIGS. 6 and 7 is provided at decision blocks 610 and 712, respectively. As described above in reference to FIGS. 6 and 7, prior to the voyage validation decision blocks, a group of parcels have been identified as well as relationship data 230 for each parcel. FIG. 9 represents one embodiment of decision block 610 of FIG. 6, and/or decision block 712 of FIG. 7.

One skilled in the relevant art will appreciate that the elements outlined for routine 900 may be implemented by one or many computing devices/components that are associated with the cargo management system 106. Accordingly, routine 900 has been logically associated as being generally performed by the cargo management system 106, and thus the following illustrative embodiments should not be construed as limiting.

At block 902, the second validation, or voyage validation routine, is initiated. At decision block 904, the cargo management system 106 determines if each parcel in the previously identified group of parcels has at least one predecessor or one successor parcel associated therewith. As described herein, such relationship information is stored in as relationship data 230 with each parcel. Thus, the relationship data 230 in each parcel is compared to make the foregoing determination. If it is determined that each parcel in the group does not have at least one predecessor or one successor then routine 900 stops as illustrated at block 912.

Alternatively, if each of the parcels has at least one predecessor or one successor parcel associated therewith, then the cargo management system 106 determines if the parcels with no predecessor are load parcels (i.e., have a "load" event identified in the corresponding activity data), as illustrated at block 906. If the cargo management system 106 determines that the parcels with no predecessor are not load parcels (i.e., do not have a "load" event identified in the corresponding activity data) then routine 900 stops as illustrated at block 912.

On the other hand, if the cargo management system 106 determines that the parcels with no predecessor are load parcels, then the routine 900 proceeds to block 908 where the cargo management system 106 determines if the parcels with no successor are discharge parcels (i.e., have a "discharge" event identified in the activity data). If the cargo management system 106 determines that the parcels with no successor are not discharge parcels, then routine 900 stops as illustrated at block 912.

If the cargo management system 106 determines that the parcels with no successor are discharge parcels, then the routine 900 continues at block 910 where the cargo management system 106 determines if there is at least one load parcel with no predecessor and at least one discharge parcel with no successor. If the cargo management system 106 determines that there is not at least one load parcel with no predecessor and at least one discharge parcel with no successor, then routine 900 stops as illustrated at block 912.

Alternatively, if the cargo management system 106 determines that there is at least one load parcel with no predecessor and at least one discharge parcel with no successor, then the cargo management system 106 determines that the second validation is successful. Processing then continues as described above at block 612 of FIG. 6 or block 714 of FIG. 7.

If one of the foregoing decision blocks is unsuccessful as indicated by FIG. 9 by a "No" the routine 900 stops as illustrated at block 912. As previously described with regards to FIGS. 6 and 7, if the routine 900 stops it may terminate, return to the start and await a new request, or generate an error message. The error message may be transmitted to the client computing device 102. In one embodiment, the client computing device 102 may override the error and force the cargo management system 106 to return a successful validation.

With further reference to FIG. 9, it is to be understood that the order of the decision blocks 904-910 may be changed without affecting the nature or scope of the embodiment. Furthermore, the cargo management system 106 may make any one or more of the determinations simultaneously or in any order. Thus, in one embodiment, (1) if each parcel has at least one predecessor or one successor, (2) parcels with no predecessor are load parcels, (3) parcels with no successor are discharge parcels, and (4) there is at least one load parcel with no predecessor and at least one discharge parcel with no successor, then the second validation routine 900 will be considered successful.

In another embodiment the second validation routine 900 may use fewer or more decision blocks. Thus, in one embodiment, if (1) each parcel has at least one predecessor or one successor, (2) parcels with no predecessor are load parcels, (3) parcels with no successor are discharge parcels, or (4) there is at least one load parcel with no predecessor and at least one discharge parcel with no successor, then the second validation routine 900 will be considered successful. Other embodiments using different data are envisioned without departing from the nature and scope of the description. For example, the cargo management system 106 may only perform one validation or part of one validation before validating a group of identified parcels. In one embodiment, the cargo management system 106 may only perform the first validation, or part thereof, as described above with reference to FIG. 8. In another embodiment, the cargo management system 106 may only perform the second validation, or part thereof, before grouping and/or validating the parcels. Thus, the cargo management system 106 need not perform both validations before grouping and/or validating the parcels. In addition, the cargo management system 106 need not perform the two validations separately, but may perform them simultaneously, or intermittently.

Figure 10A:
FIGS. 10A-10D are block diagrams illustrative of different types of voyages that the cargo management system of FIG. 1 may analyze.
Figure 10B:
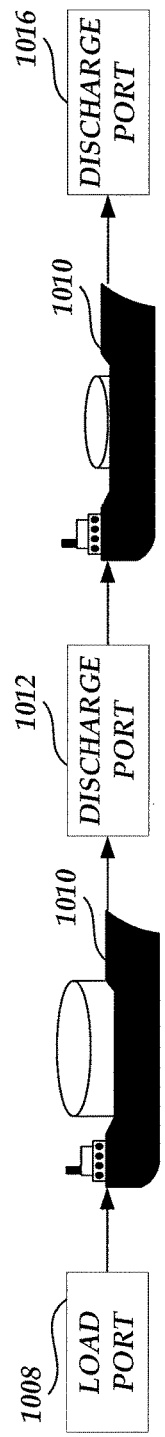
Figure 10C:
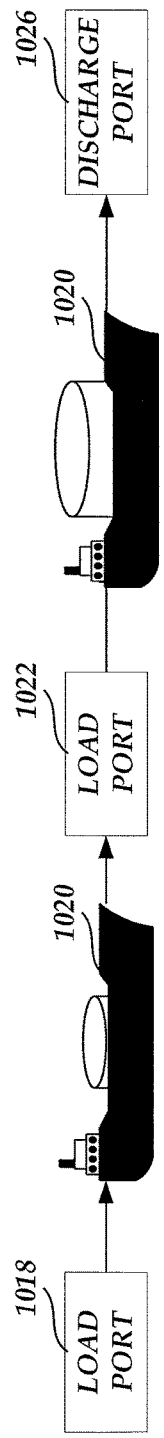
Figure 10D:
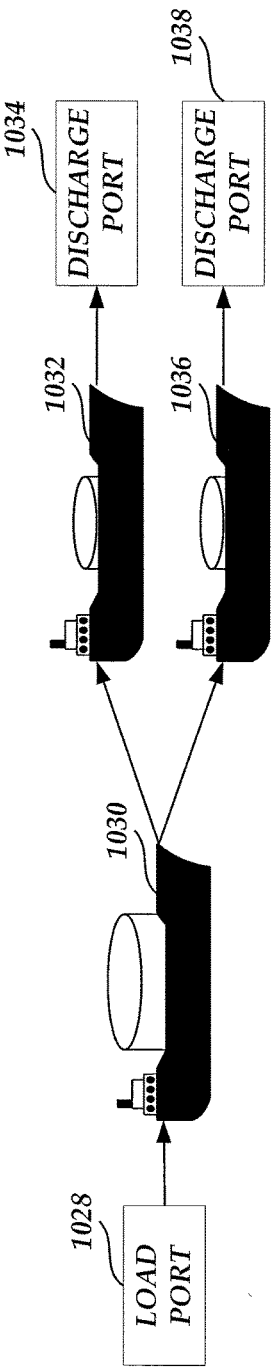

FIGS. 10A-10D are block diagrams illustrative of different voyages for which the cargo management system 106 may calculate loss reconciliation. FIG. 10A illustrates a voyage comprising one load parcel and one discharge parcel (i.e., L-D voyage). FIG. 10B illustrates a voyage comprising one load parcel and two discharge parcels (i.e., L-D-D voyage). FIG. 10C illustrates a voyage comprising two load parcels and one discharge parcel (i.e., L-L-D voyage). FIG. 10D illustrates a voyage comprising one load parcel, two transfer parcels, and two discharge parcels (i.e., L-STS-STS-D-D voyage). FIGS. 10A-10D will now be described in greater detail. FIGS. 10A-10D are illustrative only. Additional types of voyages are envisioned. For example voyages may comprise one or many loads, one or many ship-to-ship transfers, and/or one or many discharges without departing from the spirit and scope of the description.

With reference to FIG. 10A, an embodiment of how the cargo management system 106 would reconcile loss will be given for a voyage having one load parcel associated with load port 1002 and vessel 1004 and one discharge parcel associated with vessel 1004 and port 1006. For clarity, the parcels in the following examples will be referred to in relation to the vessel and port where they occur. For example, the load parcel associated with load port 1002 and vessel 1004 will be referred to as parcel 1002/1004. Similarly, the discharge parcel associated with vessel 1004 and port 1006 will be referred to as parcel 1004/1006.

The process of reconciling loss in this embodiment comprises comparing parcel data for two parcels. The cargo management system 106 receives the data for the first parcel 1002/1004. In one embodiment, first parcel data indicates that the activity is a load, the bill of lading date, the vessel that is being loaded, the quantity of cargo at the source before loading, the OBQ before loading and the quantity of cargo on board after loading. The cargo management system 106 stores that data in the data storage device 114.

In one embodiment, upon receiving data for the second parcel 1004/1006, the cargo management system 106 begins grouping and validating the first parcel 1002/1004 with the second parcel 1004/1006. In one embodiment, the second parcel data indicates the activity is a discharge, the vessel that is being discharged, the bill of lading date of the cargo, the outtake or discharge date of the cargo, the ROB after discharge, and the quantity of cargo on shore after discharge. Upon validating the parcels as discussed above, the cargo management system 106 determines the relationship between the parcels. In this embodiment the cargo management system 106 determines that the load parcel 1002/1004 is the predecessor to the discharge parcel 1004/1006, and that the discharge parcel 1004/1006 is the successor to the load parcel 1002/1004. As described above, the cargo management system 106 may determine the relationship based on the activity type of the parcel, the bill of lading date and outturn dates, or using other data deemed appropriate. The cargo management system 106 would then perform the second validation, or voyage validation, on the group as discussed above. Upon successful completion of the voyage validation, the cargo management system 106 may calculate any one or more of the load/discharge loss, in-transit loss, on board quantity/remaining on board (OBQ/ROB) loss, and voyage level loss. The results of this calculation would be stored in the data storage device 114 and provided to the client computing device 102. In one embodiment, one or more of the various losses may be calculated before grouping, or without grouping the parcels. For example, the cargo management system 106 may calculate load/discharge loss without validating a group of parcels. Thus, the cargo management system 106 may calculate the loss associated with one parcel without grouping the parcel with other parcels.

With reference to FIG. 10B, a more complicated example is given. In this embodiment, the cargo management system 106 must reconcile the losses for a voyage with one load parcel 1008/1010 and two discharge parcels (1010/1012, 1010/1016). Similarly, as discussed above, the cargo management system 106 receives the data for each of the parcels and, in one embodiment, automatically begins grouping and validating the parcels upon receipt of the third parcel's data. In another embodiment, the cargo management system 106 automatically begins grouping parcels upon receipt of the parcel data for each parcel. Thus, in one embodiment, the cargo management system 106 calculates the loss associated with parcel 1008/1010 upon receipt of the parcel data of parcel 1008/1010. In another embodiment, the cargo management system 106 groups parcel 1008/1010 with parcel 1010/1020, upon receipt of the parcel data for parcel 1010/1012, and calculates the loss associated with the two parcels. In another embodiment, the cargo management system 106 awaits a specific request to group the parcels, perform the parcel validation, perform the voyage validation, or calculate the loss before proceeding. Each parcel would contain information similar to that discussed above with reference to FIG. 10A. The cargo management system 106 uses the parcel data of each parcel to determine the relationship between the parcels and calculates the loss. In another embodiment, the cargo management system 106 receives the relationship data 230 of the parcels from the client computing device 102. In addition to the information described above, the cargo management system 106 may use other information to determine the relationship and calculate loss such as a cargo ID, ownership information, trip ID, predecessor vessel information, and the like.

FIG. 10C is similar to FIG. 10B except that there are two load parcels (1018/1020, 1022/1020) and one discharge parcel 1020/1026.

FIG. 10D is a block diagram illustrative of a voyage with a ship-to-ship (STS) transfer. In this embodiment, the cargo management system 106 may reconcile the loss for the load parcel 1028/1030, with the STS transfer parcels (1030/1032, 1030/1036) and the two discharge parcels (1032/1034, 1036/1038). In this embodiment, parcel data would be entered for the load parcel 1028/1030, each of the parcels associated with the STS transfers (1030/1032, 1030/1036), and both discharge parcels (1032/1034, 1036/1038). The parcels associated with the STS transfers may be also referred to as load parcels with additional data, or transfer parcels. In one embodiment, in addition to the parcel data entered with respect to FIGS. 10A-10C, the cargo management system 106 would receive additional parcel data indicating a predecessor vessel was involved, or that the activity was a STS transfer. In one embodiment, the cargo management system 106 may then use the additional data to determine the load/discharge loss for each parcel, in-transit loss for each leg, on board quantity/remaining on board (OBQ/ROB) loss for each vessel, and/or the loss for the entire voyage.

Figure 11:
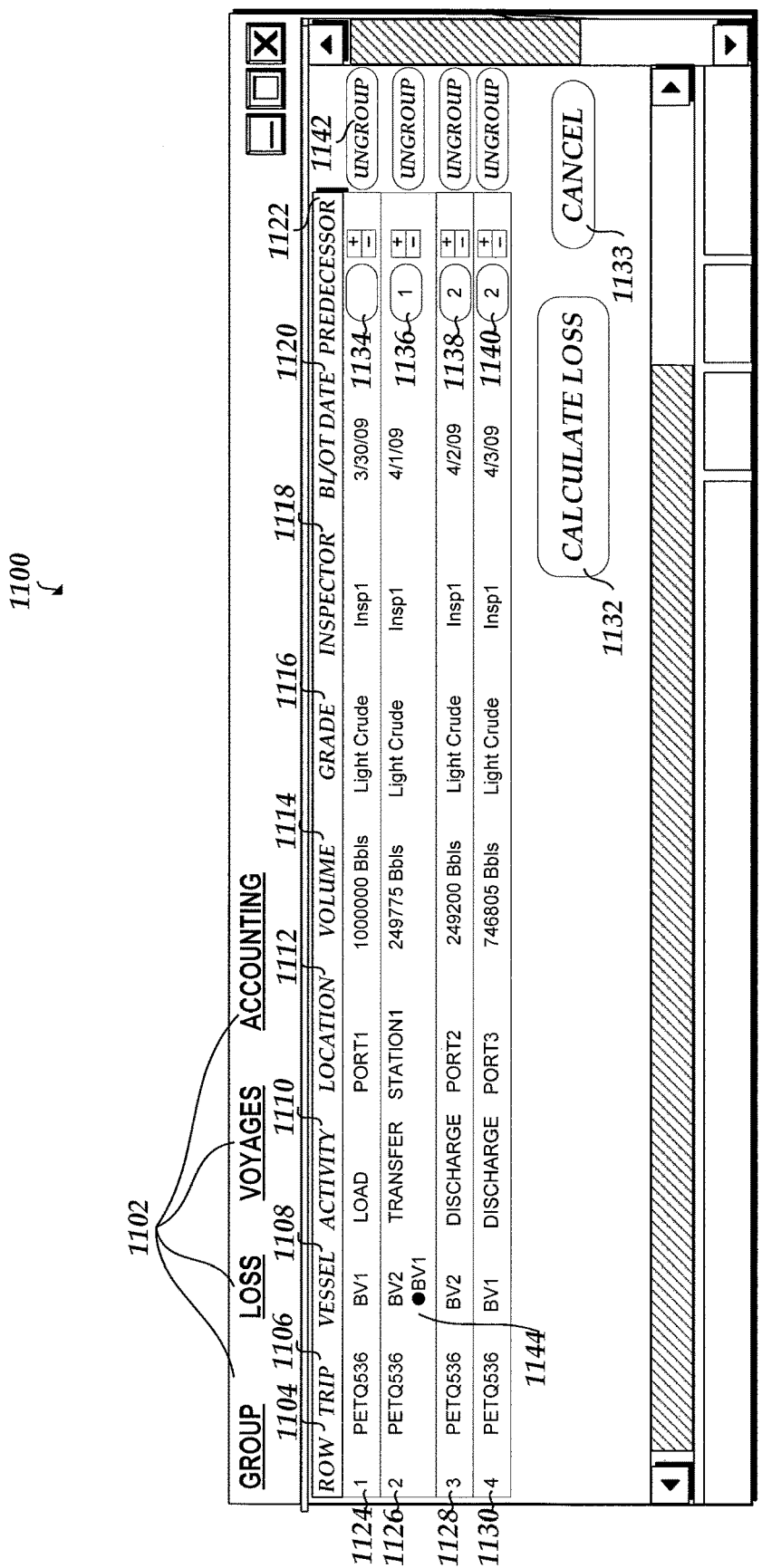
FIG. 11 is an illustrative user interface for use in entering relationship data for a group of parcels.

FIG. 11 is an illustrative user interface 1100 generated by the cargo management system 106 and presented at the client computing device 102 for use in entering relationship data 230 for a group of parcels. As illustrated, the user interface 1100 may comprise a number of different columns (1104, 1106, 1108, 1110, 1112, 1114, 1116, 1118, 1120, 1122) and rows (1124, 1126, 1128, 1130) for displaying data associated with a group of parcels. The user interface 1100 may further include links 1102 to additional resources such as calculating loss, overall voyage logs or reports, accounting information, and the like. The user interface 1100 may further include additional controls, such as calculate loss 1132, ungroup 1122, cancel 1133, and the like, as will be described in greater detail below.

With further reference to FIG. 11, each column may indicate different pieces of parcel data as well as additional information to aid in grouping the parcels. In one embodiment, the columns may include, but are not limited to, a row number column 1104, a trip ID column 1106, a vessel column 1108, an activity column 1110, a location column 1112, a volume column 1114, a grade column 1116, an inspector column 1118, a bill of lading/outtake date column 1120, and/or a predecessor column 1122. The user interface 1100 may include more or less columns without departing from the spirit and scope of the description. For example, although not illustrated in FIG. 11, the user interface 1100 may include a successor column, a relationship column, a source quantity column, a destination quantity column, or the like.

Continuing with reference to FIG. 11, each row may indicate specific parcel data 214 associated with a particular parcel. For example, as illustrated, row 1 (1124) indicates various pieces of data associated with a particular parcel. The parcel associated with row 1 (1124) is oil, and is associated with trip PETQ536, and relates to a load from PORT1 to vessel BV1. A volume associated with the parcel is 1000000 Bbls, and the cargo type associated with the parcel is light crude grade. An inspector Insp 1 and a bill of lading date of Mar. 30, 2009 are also associated with the parcel. Rows 2-4 similarly show data associated with specific parcels of the group of parcels. It is to be understood that the data shown in FIG. 11 is illustrative only and is not to be construed as limiting. In addition, the user interface 1100 may include more or less parcels, and show more or less parcel data. Furthermore, parcel data may be represented in any number of different formats without departing from the spirit or scope of the description.

With further reference to FIG. 11, row 2 (1126) also illustrates parcel data 214 associated with a parcel. The data indicates a load occurred from vessel BV1 to vessel BV2. As described earlier, such a load may also be referred to as a ship-to-ship transfer. As illustrated in row 2 (1126), the vessel column 1108 includes additional information 1142 indicating that BV1 is the predecessor vessel of BV2. In an alternative embodiment, the user interface 1100 need not show the additional predecessor vessel information 1142.

Rows 3 (1128) and 4 (1130) illustrate additional parcel data 214 associated with different parcels. The data from these parcels indicates discharges took place from BV2 to PORT2 and BV1 to PORT3, respectively.

Turning now to the predecessor column 1122 of FIG. 11, a user may indicate the relationship between the different parcels by either entering numbers, using a drop down menu, buttons, or the controls (1134, 1136, 1138, 1140) provided. It is to be understood that the relationship data 230 may further be entered in many other ways without departing from the spirit or scope of the description. For example, a pop-up menu may appear allowing the user to enter the information, the parcels may be dragged and dropped in a specific order, or the like.

As illustrated in FIG. 11, and as an example, the parcel associated with row 1 (1124) has been selected as the predecessor of the parcel associated with row 2 (1126) using the controls 1136. Similarly, the parcel associated with row 2 (1126) has been selected as the predecessor of the parcels associated with rows 3 (1128) and 4 (1130) using the controls 1138 and 1140, respectively. In one embodiment, the cargo management system 106 may determine the relationship between the parcels and transmit the relevant data to a client computing device 102. The client computing device may then display user interface 1100, as illustrated. In such an embodiment, a user using the user interface 1100 and the client computing device 102 may ungroup the parcels, change the relationship of the parcels, or the like. In an alternative embodiment, a user associated with the client computing device 102 may enter all of the relationship data 230 using the user interface 1100.

As further illustrated in FIG. 11, in one embodiment, only predecessor data may be entered. In such an embodiment, the cargo management system 106 may automatically determine that the parcel associated with row 1 (1124) is the initial load parcel because no predecessor data is entered with controls 1134. The cargo management system 106 may further determine that the parcels associated with rows 3 (1128) and 4 (1130) are the final discharge parcels because no other parcels in the group of parcels shown indicate that the parcels associated with rows 3 (1128) and 4 (1130) are predecessors. In an alternative embodiment, only successor data may be entered. In yet another embodiment, the successor and predecessor data may be determined based on the location or order of the parcels on the user interface 1100. As such, many additional methods for determining the relationship between the parcels is envisioned without departing from the nature and scope of the description.

FIG. 11 further illustrates additional controls such as ungroup 1122, calculate loss 1132, cancel 1133, and the like. By selecting the ungroup control 1122, a user may request that the user interface 1100 delete the predecessor data entered in the predecessor column 1122, that the cargo management system 106 remove a particular parcel from the group of parcels, or the like. By selecting the calculate loss control 1132, a user may request that the client computing device 102 send a request to the cargo management system 106 to calculate the loss for the group of parcels illustrated in the user interface 1100. The cargo management system 106 may then perform the voyage validation routine described earlier with reference to FIG. 9, and then calculate loss as illustrated in FIG. 7. Additional controls may be added to give the user additional options or to perform additional processing without departing from the spirit or scope of the description.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached Figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-readable non-transitory storage medium having computer-executable instructions for grouping parcels, the computer-executable instructions comprising:
   first computer executable instructions that, when implemented by a processor, cause the processor to identify parcels associated with parcel data, stored in a non-transitory storage medium, that is similar, wherein the parcel data differs between the respective parcels and indicates different quantities of cargo associated with each of the parcels;
   second computer executable instructions that, when implemented by the processor, cause the processor to validate that the identified parcels are related using parcel data for each of the parcels to form a first-validated group of parcels; and
   third computer executable instructions that, when implemented by the processor, cause the processor to validate the first-validated group of parcels to form a second-validated group of parcels, wherein the third computer executable instructions cause the processor to validate the first-validated group of parcels to form the second-validated group of parcels at least partly by causing the processor to:
   receive chronological data stored in the non-transitory storage medium and corresponding to the first-validated group of parcels,
   identify, from at least the chronological data, a relationship indicator for each parcel of the first-validated group of parcels, and
   utilize the relationship indicators to verify that the different quantities of cargo associated with each parcel of the second-validated group of parcels relate to at least a portion of the same cargo at different times during a voyage.

2. The computer-readable non-transitory storage medium of claim 1, wherein the first computer executable instructions cause the processor to identify the parcels automatically.

3. The computer-readable non-transitory storage medium of claim 1, wherein the second computer executable instructions cause the processor to validate that the identified parcels are related at least partly by verifying that the parcel data for each of the parcels contains at least one of the same cargo type data, a common vessel data, the same bill of lading date data and the same transportation mode data.

4. The computer-readable non-transitory storage medium of claim 1, wherein third computer executable instructions cause the processor to validate the first-validated group of parcels to form the second-validated group of parcels at least partly by causing the processor to perform at least one of:
- verifying that the parcel data for each parcel of the first-validated group of parcels includes at least relationship data,
- verifying that each parcel of the first-validated group of parcels that does not include relationship data of a first type includes activity data of a first type,
- verifying that each parcel of the first-validated group of parcels that does not include relationship data of a second type includes activity data of a second type,
- verifying that at least one parcel of the first-validated group of parcels does not include relationship data of a first type and includes activity data of a first type, and
- verifying that at least another parcel of the first-validated group of parcels does not include relationship data of a second type and includes activity data of a second type.

5. A system comprising:
- a computer-readable storage medium that stores parcel data associated with parcels; and
- a computer processor in communication with the computer-readable storage medium, the computer processor configured to:
  - identify a group of parcels as potentially related, wherein: each parcel of the group of parcels is associated with distinct parcel data that is stored in the computer-readable storage medium, each parcel of the group of parcels comprises cargo, and the parcel data of each parcel of the group of parcels indicates a different quantity of cargo associated with the respective parcels,
  - retrieve chronological data stored in the computer-readable storage medium and corresponding to the group of parcels,
  - identify, from the chronological data, a relationship indicator for each parcel of the group of parcels, wherein the relationship indicator indicates that each parcel of the group of parcels is as at least one of a predecessor or a successor parcel to another parcel of the group of parcels,
  - utilize the relationship indicators to verify that the different quantities of cargo associated with each parcel of the group of parcels relate to at least a portion of the same cargo at different times during a voyage, and
  - form a validated group of parcels upon validating the group of parcels, wherein each parcel of the validated group of parcels includes at least a portion of the same cargo at different times during a voyage of a particular cargo.

* * * * *